United States Patent
Kass et al.

(10) Patent No.: US 10,445,330 B2
(45) Date of Patent: *Oct. 15, 2019

(54) COMPUTERIZED TECHNICAL AUTHENTICATION AND GRADING SYSTEM FOR COLLECTIBLE OBJECTS

(71) Applicant: TAG, LLC, Sherman Oaks, CA (US)

(72) Inventors: Stephen Brent Kass, Los Angeles, CA (US); Edward Korbel, Sherman Oaks, CA (US); Daniel R. Barbakow, Los Angeles, CA (US); Robert Alan Cook, Encino, CA (US); Scot Maxwell, Tustin, CA (US); Kate Aplin, Mountain View, CA (US); Hayden Blauzvern, Austin, TX (US); Megan Shao, Torrance, CA (US); Ben Teng, Santa Clara, CA (US); Avi Thaker, Austin, TX (US)

(73) Assignee: TAG P, LLC., Sherman Oaks, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/964,690

(22) Filed: Apr. 27, 2018

(65) Prior Publication Data

US 2018/0246895 A1 Aug. 30, 2018

Related U.S. Application Data

(63) Continuation-in-part of application No. 15/706,543, filed on Sep. 15, 2017, now Pat. No. 10,146,841, which is a continuation of application No. 15/000,989, filed on Jan. 19, 2016, now Pat. No. 9,767,163.

(Continued)

(51) Int. Cl.
*G06K 9/00* (2006.01)
*G06F 16/2457* (2019.01)
*G07D 7/20* (2016.01)
*G06T 7/00* (2017.01)
(Continued)

(52) U.S. Cl.
CPC .... *G06F 16/24578* (2019.01); *G06F 16/5838* (2019.01); *G06K 9/036* (2013.01); *G06T 7/001* (2013.01); *G07D 7/20* (2013.01); *G06T 2207/30124* (2013.01); *G06T 2207/30176* (2013.01)

(58) Field of Classification Search
CPC .... H04N 1/3872; H04N 1/3875; H04N 1/387; G06T 5/001; G06T 11/60; G06T 3/0012; G06T 1/0078; G06K 9/3233; G06F 3/0484; G06F 3/04842
See application file for complete search history.

(56) References Cited

U.S. PATENT DOCUMENTS 5,018,207 A 5/1991 Purdum ................ 382/112
6,625,419 B2 9/2003 Ueno .................... 434/350
(Continued)

*Primary Examiner* — Duy M Dang
(74) *Attorney, Agent, or Firm* — Arent Fox LLP

(57) ABSTRACT

The disclosure described herein is directed to a computerized system and method of grading and authenticating collectibles utilizing digital imaging devices and processes to provide an objective, standardized, consistent high-resolution grading of collectible objects, such as but not limited to sport and non-sport trading cards. The disclosure eliminates the subjectivity present in the human grading process and overcomes the inherent limitations of the human eye.

23 Claims, 19 Drawing Sheets

Related U.S. Application Data

(60) Provisional application No. 62/104,606, filed on Jan. 16, 2015.

(51) Int. Cl.
*G06F 16/583* (2019.01)
*G06K 9/03* (2006.01)

(56) References Cited

U.S. PATENT DOCUMENTS

| | | |
|---|---|---|
| 9,767,163 B2 | 9/2017 | Kass |
| 10,146,841 B2 | 12/2018 | Kass et al. |
| 2002/0076685 A1 | 6/2002 | Ueno .......................... 434/350 |
| 2005/0197853 A1 | 9/2005 | Ueno .............................. 705/1 |

FIG. 21

COMPUTERIZED TECHNICAL AUTHENTICATION AND GRADING SYSTEM FOR COLLECTIBLE OBJECTS

RELATED APPLICATIONS

This application is a continuation in part application of Ser. No. 15/706,543 to Stephen Kass et al., filed on Sep. 15, 2017, which is a continuation application of Ser. No. 15/000,989 to Stephen Kass et al., filed on Jan. 19, 2016, now U.S. Pat. No. 9,767,163, which claims the benefit of priority of U.S. Provisional Application Ser. No. 62/104,606 to Stephen Kass et al., which was filed on Jan. 16, 2015. The contents of Ser. Nos. 15/706,543, 15/000,989 and 62/104,606, including their drawings, schematics, diagrams, and written description, are hereby incorporated in their entirety by reference.

BACKGROUND

Field

This disclosure generally relates to a grading and authenticating system and method of using the same. More particularly, the disclosure relates to a computerized system for grading and authenticating sport and non-sport card collectibles and other printed objects including event ticket, programs, photographs and the like.

Description of the Related Art

Card collecting, including sport and non-sport cards, has become, for many fans, much more than a hobby. There is a great deal of potential value in building a card collection and it could take years of research, time, and work. When a collector is interested in building a valuable card collection, it is very important for the collector to know that the condition of the card significantly affects its the value as a collectible. As such, it is very common for cards, as well as other collectible objects, to be professionally evaluated by industry recognized experts and graded in an effort to determine the value of a particular card or object. A professionally graded card is inspected for authenticity and rated on various criteria, for its condition. The card is then assigned an overall grade, generally from 1-10, sealed in a tamper-resistant holder (slab) and assigned a certification number that is maintained by the grading company. A graded card can increase the value of the card in comparison to an ungraded card of equal or similar condition by means of offering the card owner or buyer an assurance of the card's authenticity and condition.

Grading cards is based on various characteristics that pertain to the "general eye appeal" of the card. Characteristics of the card that are universally examined in the grading process are centering, corners, edges, and surface. Centering is the placement of the image (top to bottom and left to right) on the card relative to the card borders. Industry standards exist for percentage of off centering variance permitted for each of the possible card grades. The corners of the card are inspected to determine the quality of the physical condition of the corner and/or if any defect of the corners is present. The edges of the card are examined, similarly as the corners, to determine the quality of the physical condition of the edges of the card, and account for any damages and/or imperfections along the edges. The surface of the card is examined to account for any damage and/or imperfections on the card, such as scratches, creases, tears, pinholes, stains, dents, attempts at recoloring, etc.

Today there are three industry accepted grading companies that represent approximately 99% of the market. Each of the grading companies grade cards by human evaluation, primarily with the naked eye and typically devote approximately one minute per card during the grading process. Because this grading process can be highly subjective, it results in cards rarely receiving the same grade when graded by any of the three industry leaders, or the same grade when re-graded with the same grading company that previously graded the card. As such, there is no grading methodology available in the marketplace today that provides accurate and consistent results in cards as well as other collectibles, e.g., coins, stamps, etc.

Grading is, with extremely rare exception, the most significant determination of value, such fluctuations in grading often result in misstatement of value and lack of confidence in the marketplace necessary to sustain a stable and efficient market. All of the grading companies solicit resubmission of any previously graded card in its original holder (slab) by other companies or even graded by themselves for the possibility of a higher grade.

Awareness in the marketplace of the possibilities for resubmitted cards receiving higher grades has resulted in card owners breaking open the "tamper proof" holders and resubmitting the cards multiple times, if necessary, without disclosing that the card has been previously graded.

The variance in grades for resubmitted cards combined with the subjective and inconsistent card grading process itself results in creating a lack of confidence in the marketplace necessary to sustain a stable and efficient market.

The present process utilized in the grading industry creates opportunity for larger collectors (e.g. larger customers of the card grading companies) to manipulate the current system's subjective grading to their advantage by re-submitting cards for a higher grade based upon natural human variability or their influence as a large customer. Small collectors lack sufficient size to "influence" card grading and often sell cards at lower prices due to the lower grades they receive.

Without an accurate and consistent grading system in place, there are no means of preventing grading companies and/or their larger customers from exploiting grading subjectivity and doing so at the expense of the small card buyer and seller. The "small" card buyer represents the overwhelming majority of card ownership but disproportionate minority of ownership of card value. This small collector is an entry-level hobbyist, for example, a young child who buys cards of his "hero" before the youngster becomes a collector.

The collectible market's dysfunction is facilitated by a lack of applying modern visual technology and computer processing capabilities. Grading today (by hand and by eye) while traditional, is unfair, inconsistent, and has high labor content, relative to the disclosure, which is directed to a computerized grading and authentication system and method.

The disclosure is a computerized system and method for objectively grading and authenticating collectibles. The disclosure is configured to objectively grade and authenticate collectibles at a higher reliability and consistency, by using a finer resolution than is possible with the human eye. The present disclosure addresses these needs and provides further related advantages.

SUMMARY

The disclosure provides various aspects of a computerized system and method for grading and authenticating collectibles, wherein the condition and quality of an image and the material upon which that image is placed, is a component of value as determined by the market. The disclosure provides a computerized system and method to objectively grade and authenticate collectibles. The disclosure eliminates the subjectivity present in the human grading process and overcomes the inherent limitations of the human eye.

In one aspect of the disclosure, as broadly described herein, a computerized system is disclosed that grades and authenticates collectibles, comprising an image acquisition device and a computer system. The image acquisition device comprises a housing defining an internal space, an imaging device, at least one light source to illuminate at least part of the internal space, and a stage, wherein the stage is within the housing and receives a collectible. The computer system comprises at least one processor, and at least one output device, wherein the image acquisition device is configured to receive an input signal from the computer system. The image acquisition device is configured to transmit at least one output signal to the computer system. The at least one processor applies at least one image processing routine to the at least one output signal received from the image acquisition device such that the at least one processor produces grading information and transmits the grading information to the at least one output device.

In another aspect of the disclosure, as broadly described herein, a method for grading and authenticating collectibles comprising, capturing at least one image of a collectible, transmitting the at least one image to at least one processor, applying at least one image processing routine to the at least one image, producing grading information based on results of the at least one image processing routine, and transmitting the grading information to at least one output device.

This has outlined, rather broadly, the features and technical advantages of the disclosure in order that the detailed description that follows may be better understood. Additional features and advantages of the disclosure will be described below. It should be appreciated by those skilled in the art that this disclosure may be readily utilized as a basis for modifying or designing other structures for carrying out the same purposes of the present disclosure. It should also be realized by those skilled in the art that such equivalent constructions do not depart from the teachings of the disclosure as set forth in the appended claims. The novel features, which are believed to be characteristic of the disclosure, both as to its organization and method of operation, together with further objects and advantages, will be better understood from the following description when considered in connection with the accompanying figures. It is to be expressly understood, however, that each of the figures is provided for the purpose of illustration and description only and is not intended as a definition of the limits of the present disclosure.

BRIEF DESCRIPTION OF THE DRAWINGS

FIG. 21 is a view of a customized set registry report according to an aspect of the disclosure.

DETAILED DESCRIPTION

Figure 1:
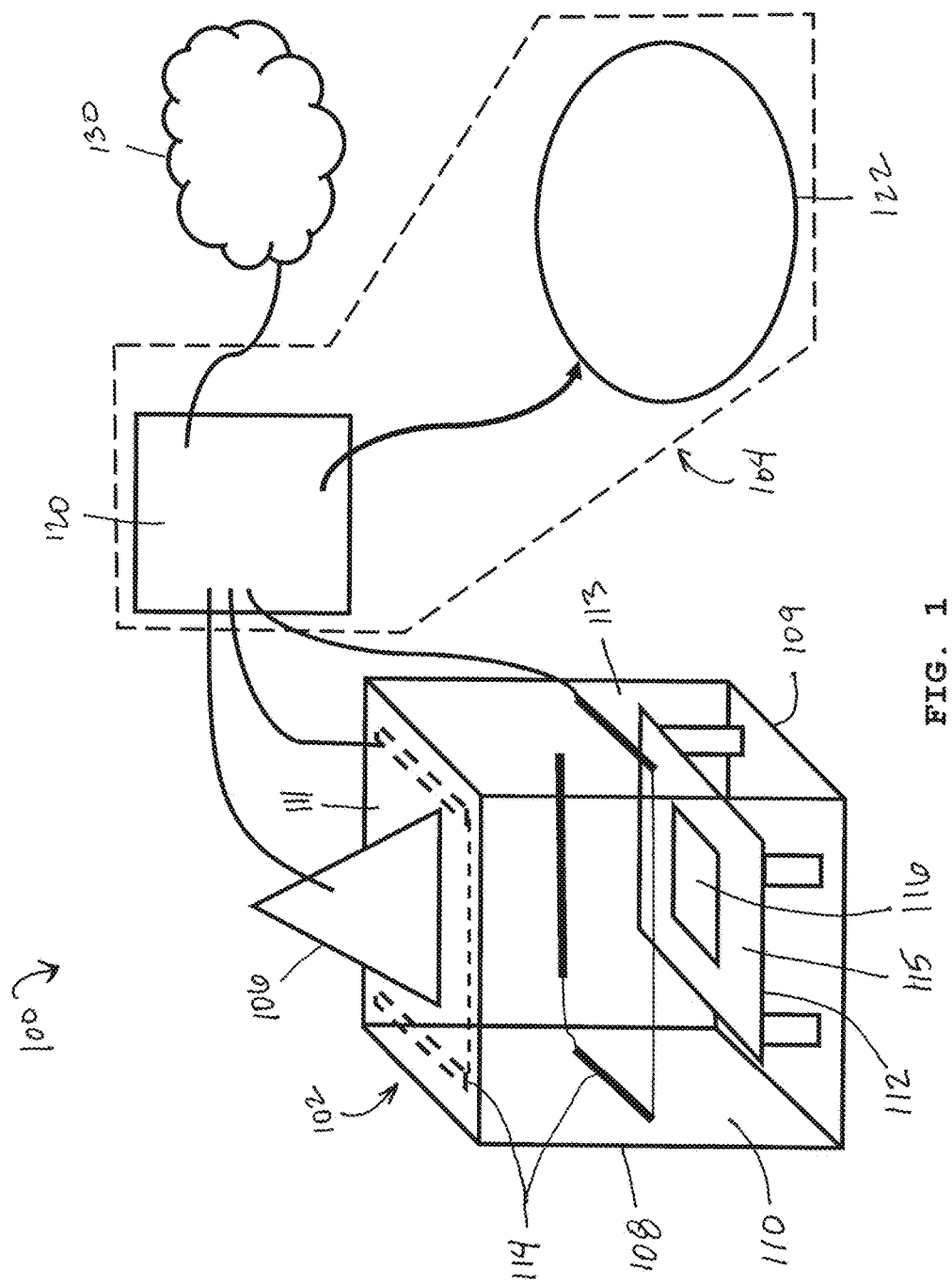
FIG. 1 is a diagram of a computerized system according to an aspect of the disclosure.

The disclosure described herein is directed to different aspects of a computerized system and method for grading and authenticating collectibles, such as but not limited to sports cards, non-sports cards, coins, stamps, photographs, autographs and the like. The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. It will be apparent, however, to those skilled in the art that these concepts may be practiced without these specific details. In some instances, well-known structures and components are shown in block diagram form in order to avoid obscuring such concepts. As described herein, the use of the term "and/or" is intended to represent an "inclusive OR", and the use of the term "or" is intended to represent an "exclusive OR".

The disclosure uses an image acquisition device that can acquire one or more high resolution images of a collectible with detail that is at a higher resolution than that of the naked eye. The high resolution images of the collectible provide an enhanced degree of detailing of the collectible than is possible with the naked eye. The image acquisition device can also be configured to examine the physical condition and/or characteristics of the collectible to determine if the collectible has been altered and/or modified. The one or more high resolution images are processed using one or more image processing routines for the purpose of gathering all data applicable to making a determination of the authenticity, condition and grading of the collectible. Through the application of image processing, an analysis and evaluation of specific criteria can be provided resulting in a more consistent, repeatable, and objective grade for collectibles being established.

The disclosure can be utilized to obtain detailed information about the collectible that is not done currently with conventional human grading systems. For example, the detailed information obtained allows the disclosure to quantify the amount of any damage present in the collectible, if the collectible has been altered from its original condition, or if the collectible has been modified in an attempt to repair and/or conceal defects. These alterations and/or modifications can be imperceptible to the human eye and can result in the human grader assigning an inaccurate grade to the collectible, which thereby improperly inflates the value of the collectible. Furthermore, although it may be possible for the human grader to identify the presence of any damage in the collectible, the human grader cannot quantify the amount of such damage present in the collectible nor evaluate with a consistent standard from grading company to grading company, individual grader to individual grader, or card to card. Conventional human grading systems are outdated, inaccurate and distort the values of the collectible market.

Additionally, the lack of sophisticated grading systems creates the opportunity for the counterfeiting of collectibles. Counterfeiting is very prevalent in the collectibles marketplace and the disclosure can assist in detecting and thereby minimizing or even eliminating counterfeiting and/or fraud in the collectibles marketplace due, in part, to the elimination of the human element in the grading process.

Counterfeit cards can be fabricated in modern times that attempt to pass for originals. The quality of counterfeit cards has increased over time such that only a trained expert can identify a counterfeit. These trained experts are usually able to tell the difference of a counterfeit and an original. However, sometimes the counterfeit card is in the tamper-proof holder or slab and complete unobstructed access to the card is limited by the tamper-proof holder. In such instances, the trained expert may not be able to determine whether the card is a counterfeit or original. The disclosure utilizing high resolution images of the card within the tamper-proof holder can determine whether the card is counterfeit through the application of image processing and a comparative analysis of known genuine cards with a card being authenticated and graded by application of proprietary algorithms of the disclosure.

The disclosure is described herein with reference to certain aspects, but it is understood that the disclosure can be embodied in many different forms and should not be construed as limited to the aspects set forth herein. In particular, the disclosure is described herein in regards to a computerized system and method for grading and authenticating collectibles, but it is understood that the disclosure can evaluate and/or examine non-collectible items wherein authenticity and/or legitimacy of a non-collectible item is desired.

Although the terms first, second, etc. may be used herein to describe various elements or components, these elements or components should not be limited by these terms. These terms are only used to distinguish one element or component from another. Thus, a first element discussed herein could be termed a second element without departing from the teachings of the present application. It is understood that actual systems or fixtures embodying the disclosure can be arranged in many different ways with many more features and elements beyond what is shown in the figures.

It is to be understood that when an element or component is referred to as being "on" another element or component, it can be directly on the other element or intervening elements may also be present. Furthermore, relative terms such as "between", "within", "below", and similar terms, may be used herein to describe a relationship of one element or component to another. It is understood that these terms are intended to encompass different orientations of the disclosure in addition to the orientation depicted in the figures.

Aspects of the disclosure are described herein with reference to illustrations that are schematic illustrations. As such, the actual thickness of elements can be different, and variations from the shapes of the illustrations as a result, for example, of manufacturing techniques and/or tolerances are expected. Thus, the elements illustrated in the figures are schematic in nature and their shapes are not intended to illustrate the precise shape of a region of a device and are not intended to limit the scope of the disclosure.

FIG. 1 shows one aspect of a computerized system 100 according to the disclosure.

The computerized system 100 comprises an image acquisition device 102 and a computer system 104. The image acquisition device 102 comprises an imaging device 106, a housing 108 defining an internal space 110, a stage 112, and at least one light source 114 to illuminate at least part of the internal space 110, wherein the stage 112 is within the housing 108 and receives a collectible 116. The computer system 104 comprises at least one processor 120 comprising processor-executable computer instructions and at least one output device 122, wherein the computer system 104 is configured to transmit one or more control signals to the image acquisition device 102.

The housing 108 comprises a base 109, a top 111, and a plurality of sidewalls 113, wherein the base 109 and top 111 are coupled to the plurality of sidewalls 113 such that the base 109 is opposite the top 111. The base 109, top 111 and plurality of sidewalls 113 define the internal space 110 of the housing 108.

The stage 112 is disposed within the internal space 110 of the housing 108 and provides a support surface 115 to receive the collectible 116. The positioning of the support surface 115 within the housing 108 is adjustable to any height within the internal space 110. In some aspects, the support surface 115 can also be adjusted about one or more axes, such that the support surface 115 can be angled with respect to the imaging device 106, at least one light source 114 or a combination thereof within the internal space 110.

An imaging device 106 is adapted to capture at least one image of the collectible 116. The at least one image of the collectible 116 captured by the imaging device 106 is a high resolution digital image of the collectible 116. The high resolution digital image is a digital representation of the collectible 116 and is processed using at least one image processing routine to determine a grade of the collectible 116 based on a set of technical grading criteria. In one aspect, the imaging device 106 can be a high resolution digital camera, such as but not limited to an 18 megapixel digital camera. However, the imaging device 106 is not intended to be limited to an 18 megapixel digital camera, and could have a resolution that is higher or lower than 18 megapixels. In addition, the imaging device 106 is not intended to be limited to a digital camera. When the imaging device used is a camera, the camera within the housing 108 is adjustable to any height within the internal space 110 to increase or decrease field of vision. In other aspects, the imaging device 106 can be a scanner or other imaging device that can create a digital image or other reproduction of the collectible 116.

In aspects wherein the imaging device is a scanner, the scanner can be physically isolated from or replace and/or supplement the housing 108 and can have its own self-contained stage 112, internal space 110, at least one light source 114, and a sensor to capture the image of the collectible on the surface. Such a scanner device is intended to be understood as an alternative or supplement in any description of the system herein. One example of a scanner can be a flatbed scanner. However, the scanner, or multiple scanners, can be arranged in many different known configurations, and is not intended to be limited to a flatbed-like scanner.

In aspects that utilize a digital camera as the imaging device, the collectible 116 is arranged on the surface 115 of the stage 112, such that the collectible fills approximately 90% of the camera's field of view. With an 18 megapixel digital camera, for example, this results in approximately 1200 pixels of resolution per inch of a typical 3.5"×2.5" collectible card. A higher resolution camera would, in turn, yield a higher-resolution image. In other aspects, the collectible can be arranged to fill more or less than the camera's field of view and is not intended to be limited to 90%. This above 1200 pixels per inch is an example of what could be considered high resolution for any imaging device 106 of the image acquisition device 102, and is not intended to be limited to aspects that utilize a digital camera. The above also applies to other imaging devices, such as but not limited to a scanner. The imaging device 106 can obtain an image of the collectible 116 in varying pixels of resolution per inch. For example, the pixels of resolution per inch can start from at least 300 pixels per inch and increase as desired. However, this example is not intended to be a baseline that needs to be met in order to qualify as high resolution. Images having 300 pixels per inch is generally accepted in digital photography as being high resolution images.

In one aspect, as shown in FIG. 1, the imaging device or camera 106 is on the top 111 of the housing 108 and is positioned to face the collectible 116 on the support surface 115, wherein the support surface 115 is proximate the bottom 109 of the housing 108. The imaging device 106 can be removably coupled to the top 111, while in other aspects, the imaging device 106 can be disposed on the top 111. The housing 108 is configured to accommodate the imaging device 106 to allow the imaging device 106 to capture the at least one image of the collectible 116.

For example, in the aspect of FIG. 1, the top 111 of the housing 108 comprises an opening (not shown) that provides access to the internal space 110 of the housing 108 which allows the imaging device 106 to be on the housing 108, external to the internal space 110. The imaging device 106 is aligned with the opening of the top 111 in order to capture the at least one image of the collectible 116. The imaging device 106 can comprise physical dimensions that are greater than the opening of the top 111 such that the imaging device 106 can be on portions of the top 111 beyond the opening.

However, in other aspects, the imaging device 106 can comprise physical dimensions that are less than or similar to the opening of the top 111. The imaging device 106 can be configured to be externally disposed with respect to the internal space 110 of the housing 108 in order to capture the at least one image of the collectible 116. In other aspects, part of the imaging device 106, for example a lens body, at least partially extends into the internal space 110 of the housing 108 in order to capture the at least one image of the collectible 116.

The housing 108 is configured to block penetration of exterior light into the internal space 110, which prevents exterior light from altering the lighting condition of the internal space 110. It is important to prevent and/or limit exterior light from entering the internal space 110 because exterior light could impinge on the collectible 116 and/or alter the pre-defined lighting condition, which could affect the accuracy of the grading of the collectible 116. At least one advantage of the disclosure is that the grading of a collectible is repeatable with very accurate and consistent results. This is due, in part, to the high resolution images captured by the imaging device 106 under controlled pre-defined lighting conditions. However, in other aspects, exterior light may enter the internal space 110 of the housing 108 such that images captured by the imaging device 106 in the presence of exterior and/or uncontrolled light are acceptable for grading.

The housing 108 further comprises at least one light source 114 to illuminate at least part of the internal space 110. The at least one light source 114 can be configured to provide a plurality of different lighting conditions, wherein the imaging device 106 captures an image of the collectible 116 under each of the different lighting conditions. The plurality of different lighting conditions accentuate the physical condition of the collectible 116 in order to detect defects and/or imperfections. For example, an indentation, scratch or crease on the collectible can cause a shadow under certain lighting conditions and the shadow can be examined to determine the extent of the indentation, scratch or crease. This is an example of the lighting conditions assisting in identifying a defect, and neither the invention nor the defects identified are intended to be limited to such examples.

The at least one light source 114 is positioned within the internal space 110 in order to provide the different lighting conditions. In the aspect of FIG. 1, the housing 108 comprises a plurality of light sources 114 that are mounted to the sidewalls 113 and the top 111 (shown in phantom). The light sources 114 are positioned within the housing 108 with respect to the collectible 116 on the support surface 115 and are configured to emit light in response to a control signal transmitted from the computer system 104. The control signal from the computer system 104 controls the on/off state of each of the light sources 114 in order to provide the different lighting conditions, wherein each of the plurality of different lighting conditions is a pre-defined lighting condition. The pre-defined lighting conditions allow collectibles 116 to be illuminated under the same set of lighting conditions that are constant and repeatable. Different pre-defined lighting conditions can be set for different types of collectibles. For example, the pre-defined lighting conditions for a baseball card may vary from the pre-defined lighting conditions of a stamp or coin.

Figure 2:
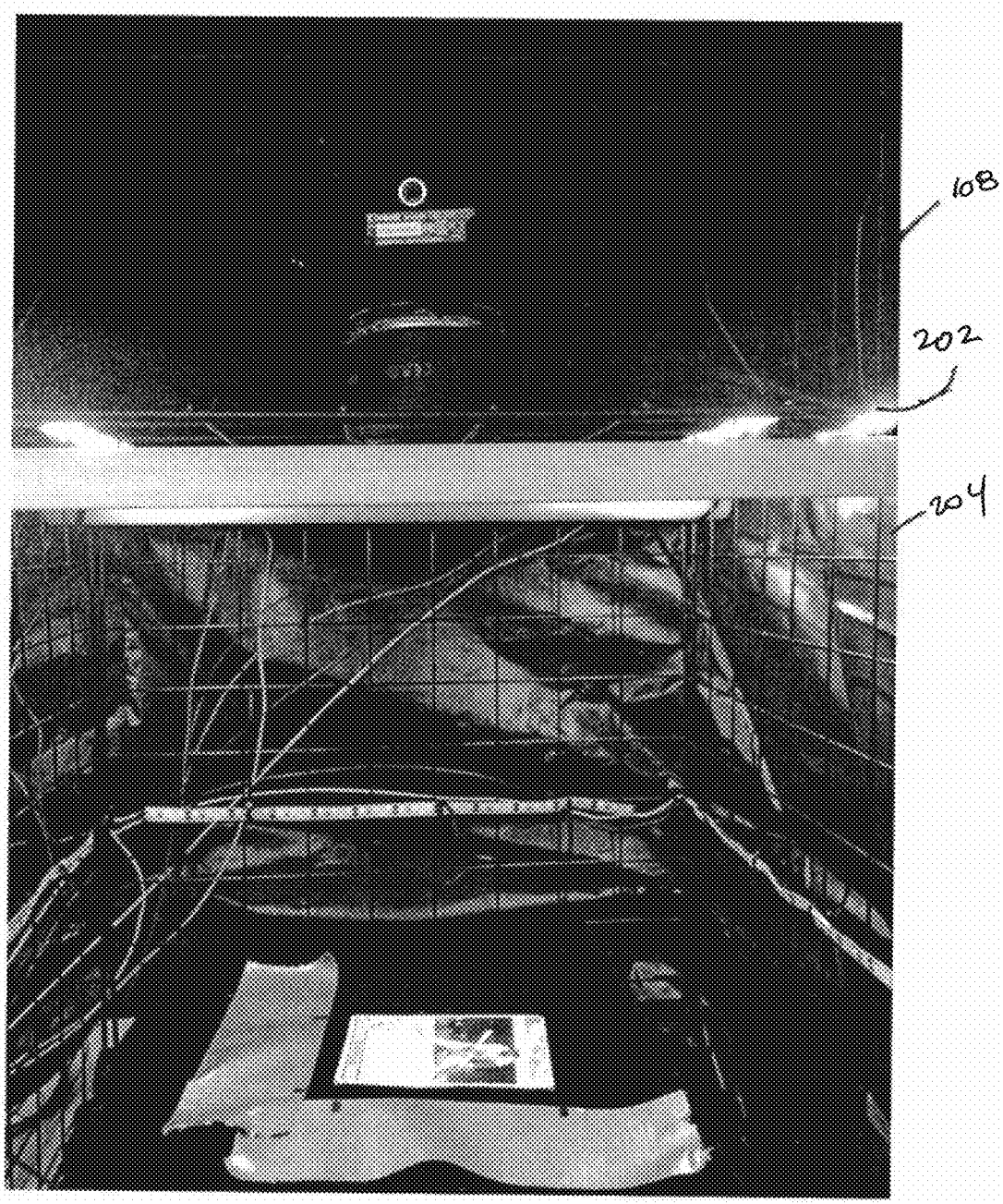
FIG. 2 is a perspective view of an image acquisition device according to an aspect of the disclosure.

In yet other aspects, as shown in FIG. 2, the imaging device 106 can be within the internal space 110 of the housing 108.

For the same or similar elements or features, the same reference numbers will be used throughout the application herein. In the aspect of FIG. 2, the housing 108 comprises a support structure 202 interposed between the base 109 and the top 111 to receive the imaging device 106. The support structure 202 provides support to the imaging device 106 such that the imaging device 106 is substantially stationary within the internal space 110. The imaging device 106 is substantially stabilized within the housing 108 in order to capture the at least one image of the collectible 116. The positioning of the support structure 202 can be adjusted to any height within the housing 108. This allows the separation between the collectible 116 and support structure 202 to be varied as desired. In other aspects, the support structure 202 can also be adjusted about one or more axes, such that the support structure 202 can be angled within the internal space 110.

The light sources 114 can comprise many different types of light sources, such as but not limited to, incandescent, fluorescent, light emitting diodes (LED), and the like, or a combination thereof. In the aspects of FIGS. 1 and 2, the light sources 114 can comprise LED light strips that are electrically connected in either series or parallel. At least one advantage of using LEDs as a light source is that LEDs provide truer color information to the imaging device 106. The LED light strips are connected to the computer system 104 and emit light in response to the control signal from the computer system 104. In one aspect, the LED light strips are individually connected to the computer system 104 and have a dedicated control signal connection. This allows for better lighting control due in part to LEDs being more exact in terms of light emission. While in other aspects, the LED light strips are connected to the computer system 104 using a shared control signal connection.

The housing 108 can comprise many different materials and/or many different configurations. For example, in the aspect of FIG. 1, the base 109, the top 111, and the sidewalls 113 of the housing 108 comprise solid construction material that substantially blocks exterior light. In other aspects, as shown in FIG. 2, the housing 108 comprises a metal-wire scaffolding. The housing 108 of FIG. 2 does not, by itself, substantially block exterior light, and therefore further comprises a cover 204 that covers the housing 108. The cover 204 can be a blackout curtain known in the art that are used to block light, or can be any other material, device or structure that blocks out exterior light. The cover 204 can also be used with the housing 108 of the aspect of FIG. 1 in an effort to further ensure that substantially all exterior light is blocked out and does not enter the housing 108. Exterior light entering the internal space 110 could alter the lighting condition within the internal space that could result in an erroneous grading of the collectible. In other aspects, the housing 108 can comprise an access panel or other means for accessing the internal space 110, such as but not limited to a hinged sidewall or part of a sidewall being hinged.

The disclosure is not intended to be limited to the configuration and/or the number of light sources 114 disclosed in the aspects of FIGS. 1 and 2. The light sources 114 can be arranged in many different configurations within the housing 108, and can comprise the same or different amount of light sources 114. For example, in other aspects, the light sources 114 can only be on one or more sidewalls 113, whereas in other aspects the light sources 114 can only be on the top.

The computer system 104 comprises at least one processor 120 and at least one output device 122, wherein the computer system 104 is configured to transmit one or more control signals to the image acquisition device 102. The one or more control signals provide instructions to each of the at least one light source 114 and the imaging device 106. The computer system 104 transmits instructions via the control signal to the at least one light source 114 such that the at least one light source 114 provides a desired lighting condition in accordance with the instructions. The computer system 104 can also send a control signal to the imaging device 106 with instructions to capture an image of the collectible 116 after the at least one light source 114 is illuminating the collectible 116 under the desired lighting condition. The image acquisition device 102 thereby transmits an output signal to the computer system 104, wherein the output signal comprises the captured image of the collectible. In one aspect, the image acquisition device 102 can transmit the output signal to the computer system along the same connection that the image acquisition device 102 received the control signal from the computer system 104, while in other aspects, the output signal is transmitted from the image acquisition device 102 to the computer system 104 along a different connection. The connections between the image acquisition device 102 and the computer system 104 can be wired connections, wireless connections, or a combination thereof.

The computer system 104 can be configured to run a script comprising a series of instructions for the imaging device 106 and the light sources 114. For example, in one aspect, the script can comprise a sequence of actions wherein a series of control signals are transmitted to the imaging device or digital camera 106 and the light sources 114 such that the on/off state of one or more of the light sources 114 is activated/deactivated to provide one of a series of pre-defined lighting conditions, wherein the imaging device or digital camera 106 captures an image of the collectible 116 illuminated, if needed, in each one of the series of pre-defined lighting conditions, such that after each image is captured, the imaging device 106 transmits the captured image to the computer system 104, and the computer system 104 labels the image using metadata, exchangeable image file format (exif), and the like, and/or by naming the image filename to indicate the lighting condition under which the image was taken. This process repeats until an image has been captured under each of the series of pre-defined lighting conditions. The collectible 116 is stationary on the surface 115 and its positioning is not altered while the series of instructions are implemented by the light sources 114 and the imaging device 106. This results in each of the captured images being substantially aligned while illuminated under the different lighting conditions.

In one aspect, there can be nine different lighting conditions in which an image of the collectible 116 is to be captured. This will result in a set of seven to nine images of the collectible 116 in the seven to nine different lighting conditions. These images will then be processed and analyzed by the computer system 104 to determine a grade for the collectible 116. The disclosure is not intended to be limited to only seven to nine different lighting conditions. The disclosure can comprise more or less than seven to nine light different lighting conditions resulting in any number of images of the collectible.

In some aspects, the different lighting conditions can be provided by activating one of the light sources 114 and deactivating the remaining light sources 114, and repeats until each of the light sources has been activated individually. The number of captured images of the collectible 116 in different lighting conditions can be proportional to the number of light sources 114, or can be independent of the number of light sources 114. In other aspects, the different lighting conditions can be provided by activating a plurality of the light sources 114 and deactivating the remaining light sources 114. In such aspects, the intensity of light emission of the plurality of light sources 114 that are activated can be equivalent or different.

After the series of instructions has been completed, the collectible 116 can be repositioned, either automatically or manually, in order to capture images of another side of the collectible 116 utilizing the same and/or different series of instructions. For example, a collectible 116, such as but not limited to a baseball card, has a front side and a back side, such that when all the images of the front side have been captured, the baseball card can be automatically or manually turned over on the surface 115 to capture images of the back side. The lighting conditions for the back side of the card can be the same or different than the front side. For example, one side of the card can be glossy while the other side is not, such that different lighting conditions may be needed to give a proper grade. In one aspect, images of both the front and back sides of the baseball card under the different lighting conditions can be taken for the purpose of grading the baseball card. However, in other aspects, images of only one side of the baseball card can be taken for the purpose of grading the baseball card. In yet other aspects, the collectible 116 can comprise a plurality of sides, wherein images of each of the plurality of sides can be captured in the different lighting conditions for the purpose of grading the collectible 116. However, in other aspects, images of at least one of the plurality of sides can be captured in the different lighting conditions for the purpose of grading the collectible 116. The collectible 116 can be repositioned manually to expose another side, while in other aspects, the repositioning of the collectible 116 could be automated. In yet other aspects, the image acquisition device 102 can comprise a plurality of imaging devices 106, such that the image acquisition device 102 can capture images of the top and bottom sides of the collectible 116 simultaneously, or without having to turn over the collectible to capture images of another side of the collectible. In such aspects, the collectible 116 can be interposed between the plurality of imaging devices 106.

Upon completion of the series of instructions, the computer system 104 will have a single or a plurality of images of the collectible 116, wherein each image is a high resolution image of at least a portion of the entire surface of the collectible 116 illuminated in a different lighting condition. Each image are labeled by the computer system 104 to identify the lighting condition it was taken. The images can be stored on an internal storage device of the computer system 104 or can be stored on an external storage device that is accessible by the computer system 104. The images will then be processed and analyzed under one or more image processing routines. In one aspect, after the computer system 104 receives the images from the image acquisition device 102, or from an image source external to the image acquisition device, the computer system 104 applies at least one image processing routine wherein the images are substantially aligned such that all the images are in substantially the same orientation and/or dimensions as each image in the database and with each future image created for grading. This allows for images to be overlaid and assist in the image processing. In some aspects, the system 100 comprises one or more collectible image sources and creates and stores one or more images of the respective collectible 116, wherein multiple collectibles 116 can be graded concurrently from each image source. For example, the system 100 can comprise a plurality of image acquisition devices 102 and/or configured to receive at least one external signal comprising an image of a collectible. This allows the system 100 to grade multiple collectibles 116 and operate in an efficient manner.

For a firmware and/or software implementation, the methodologies may be implemented with modules (e.g., procedures, functions, routines and so on) that perform the functions described herein. A machine-readable medium tangibly embodying instructions may be used in implementing the methodologies described herein. For example, software codes may be stored in a memory and executed by a processor unit. Memory may be implemented within the processor unit or external to the processor unit. As used herein, the term "memory" refers to types of long term, short term, volatile, nonvolatile, or other memory and is not to be limited to a particular type of memory or number of memories, or type of media upon which memory is stored.

If implemented in firmware and/or software, the functions may be stored as one or more instructions or code on a computer-readable medium. Examples include computer-readable media encoded with a data structure and computer-readable media encoded with a computer program. Computer-readable media includes physical computer storage media. A storage medium may be an available medium that can be accessed by a computer. By way of example, and not limitation, such computer-readable media can include RAM, ROM, EEPROM, CD-ROM or other optical disk storage, magnetic disk storage, solid state or other magnetic storage devices, or other medium that can be used to store desired program code in the form of instructions or data structures and that can be accessed by a computer; disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

In addition to storage on computer readable medium, instructions and/or data may be provided as signals on transmission media included in a communication apparatus. For example, a communication apparatus may include a transceiver having signals indicative of instructions and data. The instructions and data are configured to cause one or more processors to implement the functions outlined in the claims.

In one aspect, the computerized system 100 is configured to objectively grade collectibles 116, such as but not limited to baseball cards, according to a set of technical grading criteria (see listing of Table 1). The methodology for detecting defects in a collectible 116 comprises the collectible 116 being examined for variations of each criteria with respect to a perfect reference image or Golden Image stored in a database 130.

TABLE 1

| Number | Category | Criteria |
|---|---|---|
| 1. | Overall Subject Eye Appeal | Color |
| | | Centering |
| | | Stains |
| | | Scratching |
| | | Creasing |
| | | Printing errors |
| | | Shape |
| | Size of Subject | Length (permitted variance to allow for inexact cutting older subjects) |
| | Diameter | Width (permitted variance to allow for inexact cutting older subjects) |
| | Thickness of Subject | Consistency (has part or whole of subject been pressed) |
| | Identification of Subject | Year of set (manufacture) |
| | | Name of Manufacturer |
| | | Player or person name |
| | | Player or person status (R, HOF, error Subject) |
| | | Subject number |
| | | Subject owner |
| | | Subject registration number or file number |
| | | Subject detail grading specifics for point reductions |
| | Inconsistencies | Specific alerts color |
| | | Specific alerts borders |
| | | Mis-cut (length and width) |
| 2. | Corners | Angle, Residual, Fray and Fill |
| | | Hanging fiber |
| | | Dents |
| | | Chips |
| | | Folds |
| | | Crease |
| | | Scratches |
| | | Trimming |
| | | Bleaching |
| | | Added material |
| | | Added Coloring |
| | | Pressing |
| | | Moistening |
| | | Gluing |
| 3. | Subject Surface | Gloss |
| | | Color (including no added color) |
| | | Borders (including no bleaching or cutting) |
| | | Misprinting/print defects |
| | | Mis-cut |
| | | Creases |
| | | Cracks |
| | | Folds |
| | | Chips |
| | | Scratches |
| | | Pin holes |
| | | Tape and other stains |
| | | Tears |
| | | Variations from Golden Image |
| | | Known Counterfeit Defects |
| 4 | Centering | Front of subject: Left/Right |
| | | Front of subject: Top/Bottom |
| | | Back of subject: Left/Right |
| | | Back of subject: Top/Bottom |
| | | Image skew |
| 5. | Subject Back | Stains |
| | | Print errors |
| | | Dents |
| | | Chips |
| | | Folds |
| | | Creases |
| | | Scratches |
| | | Variations from Golden Image |
| | | Pin holes |
| | | Tape and other stains |
| | | Tears |
| 6. | Edges | Cutting razor marks |
| | | Cutting and no hanging fiber |
| | | Cutting resulting whiteness |
| | | Cutting and resulting subject dimensions |
| | | Laser cutting |
| | | Laser cutting and no hanging fibers |
| | | Laser cutting resulting subject dimensions |
| | | Signs of pressing |
| | | Signs of adding material |
| | | Signs of bleaching (centering) |
| | | Signs of coloring |
| | | Gluing |
| | | Moisture |
| | | Stretching |
| | | Shrinking |
| | | Peaks & Valleys |
| | | Fraying |
| | | Sanding or filing |
| | | Pressing |
| | | Polishing |

A Golden image 117 for a collectible 116, i.e., perfect image without any unintended defects included by its originator, may be created in the following manners: (1) An image of the collectible 116 in its original format ("Original Golden Image") is supplied by its creator and entered into the computerized system 100 and stored in a file (the "Image Library") in a tangible computer memory medium, such as the database 130; (2) a Golden Image is created by altering and enhancing a collectible 116 image ("Virtual Golden Image") by removing all detectable defects unintended by its originator through the use of image processing and storing the newly created Virtual Golden image in a "Golden Image Library" in a tangible computer memory medium, for example, in a data structure, such as the database 130; (3) the highest graded card graded by the system 100 becomes the de facto Golden image until a higher graded card is found; or (4) by using machine learning, assembling perfect portions of other copies of the same card contained within the database. In aspects where the golden image for a collectible is not available, the system can use the highest graded card as the defacto golden image. Subsequent grading of similar cards with higher grades can become the new golden image. The system 100 might not know what defects were unintended or get an original image from the creator to have a golden image. As such the system 100 is configured to create a golden image by using the highest graded card. In other aspects, the system 100 can create a golden image by taking portions of different graded cards that are highly graded and combine them with other high graded portions to form a golden image.

Machine learning maps visual features to an overall card grade that is accurate and consistent beyond what human graders can provide. In one aspect, a machine-learning algorithm, known as k-nearest neighbors, combines the values of measured attributes into a single score for the portion of the card or collectible being evaluated. In one aspect, the k value for the nearest neighbors can be 11, such that the eleven nearest neighbors are used. However, other k values for the nearest neighbor can be used and the disclosure is not intended to be limited to a value of 11 for k. In an example of obtaining a corner score for a card using machine learning, the corner algorithm can examine a number of attributes, such as, for example, 4 attributes, and derive individual corner scores for each of the four corners. From those four individual corner scores, the overall card corner score is computed. The fundamental computation of a single corner score is derived from individual corner scores for each of the four corners using a proprietary algorithm to weight the four corner scores to arrive at the single corner score. A weighting of the four corner scores may include a small increase in the minimum value in certain situations, such as, when the lowest scored corner is significantly different from the other three corners, or when the overall card grade will not be above a pre-established threshold grade (on a 10 point scale). The increase can be 0.25 point, but can be set at other values. The result is the overall card corner score that can be expressed on a 1000 point scale (that is, with a resolution of ⅟1000). The card corner score can also be expressed with the same relative resolution on a 10 point scale. The machine learning algorithms can be further refined by input from trained professional human graders.

The database 130 comprises a datastore of known collectibles, such as but not limited to baseball cards. The database 130 comprises as many images of collectible as possible, and grows as additional images are added. The database 130 can also grow as the computerized system 100 is used to grade collectibles. Along with each image, a set of metadata is stored, which can comprise information about the collectible or baseball card 116, such as but not limited to: manufacturer of the card; year of the card's manufacturing; series name of the card; name of player or person on the card; the card number; any variation particular to that card series, e.g. red-black or gray-black; any ownership information available; any distinctive features or other information unique to that particular card, e.g., distinctions such as, but not limited to, Hall of Fame, Rookie, traded, high number, limited production, etc.; geometric information about where the inner-image appears within the cardstock or value-altering variations, e.g., autographs on the card. This set of metadata is described in relation to baseball cards, but the metadata is not intended to be limited to baseball cards. Metadata of other types of collectibles can also be collected. The computerized system 100 can be configured to allow the addition of any grading-specific information into the computer system 104 in order to facilitate faster processing or specific tasks. For instance, the computer system 104 could receive a test file comprising a set of initial perceptual hashes, which would speed the matching of a newly-imaged collectible or card 116 to the known cards of the database 130. Alternatively, it might include information about the owner of the currently-imaged card or collectible 116, wherein the database 130 options can then be filtered by that information and the best-match of only that owner could be found.

In one aspect, a comparison between the image of the collectible 116 and the Golden image 117 is conducted by the computer system 104. The image of the collectible 116 is first obtained and identified, as discussed above, by the computer system 104, and the Golden image 117 corresponding to the collectible 116 is retrieved from the Golden Image Library stored on the database 130. After the Golden image 117 for the collectible 116 is retrieved, one or more image processing routines are applied to the image of the collectible 116 for the purpose of gathering all data applicable to making a determination of the authenticity, condition and grading of the collectible 116. An example of an image processing routine utilized is a card identification algorithm. The card-ID algorithm takes as input the image of the collectible or card 116 and outputs the identity of the card, if there is a match available in the database 130. If there is no match, the algorithm issues alert to indicate that this is the first time this specific collectible or card 116 has been seen and a prior image does not yet exist in the image database. In this case, information about the card (manufacturer, etc.) can be manually inputted into the database 130, and that information along with the image of the collectible or card 116 will be added to the database 130. The card-ID algorithm distills all of the captured images of the collectible or card 116 into the database 130 in 64-bit perceptual hashes, as known in the art.

When the system 104 receives a newly-obtained image of a collectible or card 116, its 64-bit perceptual hash is also computed. Then, the perceptual hash of the newly-obtained image is compared to all of the known hashes from the database 130. The top 200 closest matches are then considered, one-by-one, and the collectible's or card's 116 pixels are directly compared to the images in the database 130 using a template matching process, such as but not limited to OpenCV's template-matching. The best of those template-matched images, if within a threshold, is declared the correct match or archived, if running in batch mode. If none of the images matches within the threshold, the system 104 declares that no match was found. The system 104 is not intended to be limited to computing 64-bit perceptual hashes of the images. In some aspects, the system 104 can compute perceptual hashes of varying sizes, higher or lower than 64-bit, such as but not limited to, 128-bit, 256-bit, etc. In some aspects, the system 104 can utilize various hash functions and is not intended to be limited to perceptual hash functions.

Table 1 identifies various specific criteria that may be examined by the image processing methods of the disclosure, in any combination, using six broad categories of criteria. Through the use of thresholds and algorithms, collectible 116 data is collected and applied to four condensed categories (Front and Back): (1) Corners; (2) Edges; (3) Surface; and (4) Centering. Within each category, as well as for general eye appeal, many image processing methods/algorithms may be utilized so that, for example, 72 or more criteria may be evaluated and analyzed for each collectible 116.

After all the images are collected and processed, 50 separate raw data scores of 1-1,000 are determined for each card—25 for the front side and 25 for the back side, thereby giving a total maximum raw card score of 50,000. The raw scores can be collected for the front and back as follows: 16 raw corner scores comprised of scores up to a maximum of 1,000 each for Fray, Fill, Residual and Angle (these terms to be defined within), thereby a maximum "Raw" score of 4,000 for each of the four corners for a total of 16,000 for corners; 4 Centering (defined herein) scores up to a maximum of 1,000 each for—top, bottom, left, right, thereby a maximum total raw score of 4,000 for centering; 4 Edge (defined herein) scores—up to a maximum raw score of 1,000 each for top, bottom, left, right thereby a maximum total raw Edge score of 4,000 for edges; 1 Surface score (defined herein)—combining the data from all surface defects for maximum raw Surface score of 1,000 for surface. This provides a possible maximum total raw score of 25,000 each for front and back of the card.

The 25 raw scores for front and back are processed by proprietary algorithms to arrive at 11 attribute scores, for each of the front and back of the collectible, up to a maximum of 1,000 each for front and back: 4 attribute Corner Scores up to a maximum attribute score of 4,000; 2 attribute Centering Scores, for top/bottom and left/right, up to a maximum attribute score of 2,000; 4 attribute Edge Scores, for top, bottom, left and right, up to a maximum attribute score of 4,000; and 1 attribute Surface Score up to a maximum attribute score of 1,000. This then provides a possible maximum total attribute score of 11,000 each for front and back of the card for a total of 22,000. These scores are then processed by proprietary algorithms to arrive at a single Card Grade with a maximum possible Card Grade of 1000. The numeric values used herein are illustrative but do not limit this disclosure in any way. This disclosure's algorithms can use scales sufficient to capture the accuracy and repeatability of the image-processing and final grades.

The computerized system 100 can utilize numerous image processing tools. The underlying image processing technology required for carrying out the various aspects of the disclosure and variations thereof is readily available in the art. For example, facial recognition technology utilizes a "Subject" photo and scans one or more databases (Image Libraries) to locate the Subject within the Library. In this locator process the purpose is to identify the Subject and to compare the Subject to a Golden Image once retrieved from an image library for the purpose of establishing a probability of a "match".

In one aspect, the computerized system 100 measures light diffraction from an edge or surface defect and measures peaks and valleys on the edge indicating extrusions or indents on the edge relative to a straight line fitted on the edge or as with surface defects with high precision measurement of the degree (length and area) of light diffusion by number of pixels or other area measurement. Mixing Red, Green and Blue to form millions of colors and shades of similar colors creates the color palette from which all colors are derived. The computerized system 100 may, for example, utilize 256 different reds, 256 different blues and 256 different greens (the known color palate) to create the entire color palette of 16,777,216 different colors. With the use of highly sensitive lenses and resolution, individual pixels can be measured and any change in color can be identified and measured. Any scratch or blemish may be identified and measured for length, width, area (in pixels for example) and location on the collectible 116. Light may be directed at the collectible 116 from above and the computerized system 100 identifies and measures the increase or decrease in the surface of the collectible 116 thus identifying depression in surface, pressing of materials, a wave on the surface, and/or altering of the paper stock within the collectible 116, etc.

Another example of an image processing routine is an image subtraction, wherein all data points on a Golden Image 117 may be utilized to eliminate all identical data points on the front and back of the collectible 116. The data that remains on the front or back of the collectible is thereby determined to be one or more defects (a mark or space not on the Golden Image) in the collectible. Image Subtraction may be utilized to determine differences in the collectible from the Golden Image such as but not limited to color (fading, alteration, re-coloring and other alterations; like bleaching of image and/or card, etc.) or scratches, chips, or dents. In similar fashion, image subtraction can also identify existing stains, added color to fill in areas of defect, printing errors, the effects of bleaching, stain removal, the addition of material (i.e., paper stock) or other material and image removal for the purpose of altering the width of the collectible's borders in an attempt to re-center the collectible.

Figures 16A, 16B:
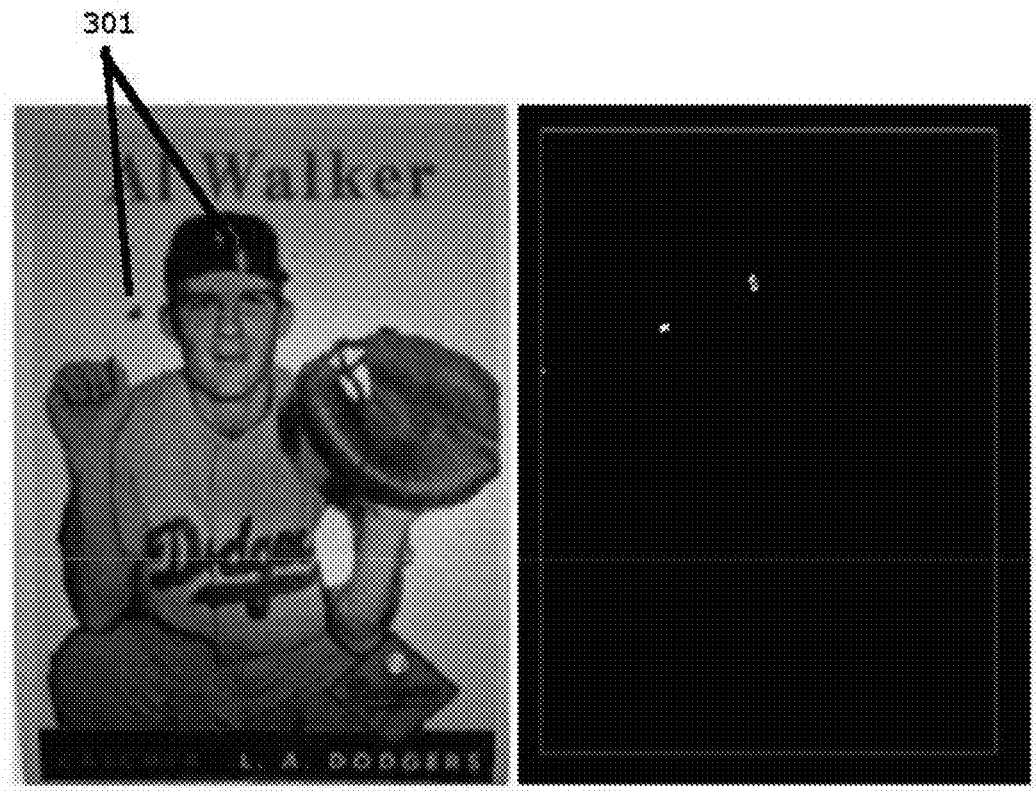
FIG. 16A is a view a collectible and a partial view of surface grading of the grade report from the computerized systems according to an aspect of the disclosure.
FIG. 16B is a partial view of surface grading of the collectible of FIG. 16A.
Figure 17:
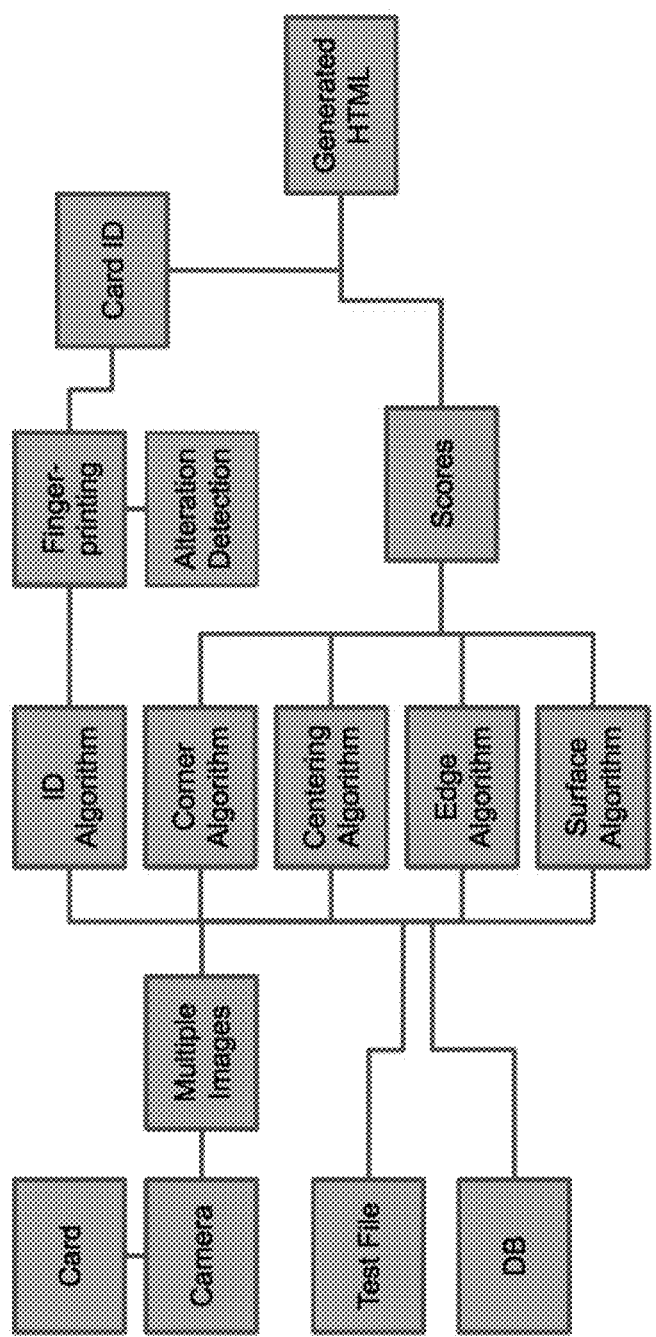
FIG. 17 is a diagram of a computerized system according to an aspect of the disclosure.

FIGS. 16A and 16B illustrate an example of image subtraction. The defect spots 301 on the card of FIG. 16A are all that remain after image subtraction, as shown in FIG. 16B. In this manner, the system 100 can determine the number of defects identified on the collectible as compared to the Golden Image. The system 100 may also be configured to measure the individual defects, measure the cumulative total number of defects and/or measure the individual and combined area of the surface covered by the defects.

The system 100 can be configured to calculate through the use of various pixel measurements at high magnification and resolution whether a collectible 116 has been resubmitted for grading by the system 100, and has either been switched or altered from its initial grading. Any previously graded card can be re-graded and can subsequently be authenticated as the original collectible thus eliminating counterfeiting and alteration. The system 100 may be configured to "fingerprint" each collectible using high-resolution imagery. The images captured by the image acquisition device 102 under the different lighting conditions highlight and uncover the unique physical characteristics and/or defects of each card that is graded by the system 100. These characteristics and/or defects are unique to each card and are difficult, if not impossible, to replicate. These images are stored on the database 103 and serve as a fingerprint of the graded card based on the physical characteristics and/or defects of the card. The system 100 may store the high-resolution image in a collectible image file and is able to use the "fingerprint" to authenticate a collectible that is in a holder ("Slab") or other grading company's holder if the collectible was put in a slab by another company but graded by the system 100. In both instances, the collectible need not be removed from the holder ("Slab") to authenticate it. The system 100 is able to store a high-resolution image of a collectible and create a "fingerprint" of the collectible for future authentication purposes of all collectibles graded by the system 100 even if the previously graded collectible remains in its slab. If a person desires, and if the image can be collected under acceptable lighting conditions, it may be possible to use a smart phone camera or other remote digital camera or smart phone app or other computerized application to record an image of the collectible for which authentication is desired. The system 100 may be configured to receive a signal external from the image acquisition device 102 comprising at least one image of the collectible to be authenticated and will identify its stored "fingerprint" image and compare the corners, borders, centering and edges for fiber, pixel and other measurement data that will confirm, at least preliminarily, if the collectible is the authentic collectible or a replacement (substitution) of a previously graded collectible or is a counterfeit of the collectible.

A corner algorithm measures several visual attributes whose combination will yield an accurate estimate of the corner score for each of the card's four corners. The source code serves as the most detailed definition of the image attributes, but we describe here the motivating idea for each:

a. [angle] A line is fit to each of the corner's perpendicular edges, and the nearness to a sharp right angle (90 degrees) produces the corner-shape attribute: the closer to 90 degrees, the higher the score.

b. [residual] This attribute measures how close the edge of the cardstock comes to the mathematical lines that define the corner: the closer, the higher the score.

c. [fill] The extent to which the cardstock is present throughout the mathematically-defined corner: the more that is present, the higher the fill attribute.

d. [fray] The attribute measures the fall-off in the cardstock near the corner: the less fraying there is, and thus the higher the score.

Through the disclosure's proprietary algorithms, those four individual corner attribute scores are then calculated to generate a score for each of the corners and for the four corners as a single corner score of the subject card.

An edge algorithm measures at least three attributes for each of the four edges of the card from a certain distance from the corners, such as 0.75 inches from the corner. This distance can be adjusted by the system 104. Each of these three attributes corresponds may be used to identify defects on each of the four edges:

a. [residual] The differences between the actual cardstock edge and the mathematical line that approximates that edge. The area of these "peaks and valleys" is measured: the smaller the area, the higher the value of this residual attribute.

b. [fray] The change in the color of the cardstock as it transitions from the edge toward the interior of the card is also measured: less change indicates that the margin of the card is more pristine and carries a higher value for this fray attribute.

c. [color] In addition, the uniformity of the color across the edge is an important consideration: the more uniform, the better the value of this color edge attribute.

As with corners, the individual edge-score results from a learned relationship among these three attributes, based on knowledge from previously graded cards, predetermined perfect 90 degree angles or perfect straight lines, and/or from accepted and quantified industry standards. Through the disclosure's proprietary algorithms those four individual-edge scores, top, bottom, left and right, are then calculated to generate a score for the edges of the object card.

The outermost vertical and horizontal edges of a card when looked at, from above, at high resolution can show an imperfect edge that may have been subject to various points of indentation and/or expansion (peaks and valleys). These edge imperfections may be the result of improper cutting of the edge, alterations of the edge, pressure from rubber bands, pressure from fingers, pressure from storage methodology or a card being impacted or dropped. Under high magnification and resolution they are unique and constitute a "fingerprint" for the card. The system 100 may be configured to fit a virtual line parallel to the outermost right and left side edges from the top edge of the card to the bottom edge of the card ("Vertical Centering Line" left or right, front or back) or from the left outermost edge of the card to the right outermost edge ("Horizontal Centering Line" top or bottom, front or back). Horizontal Centering Lines and Vertical Centering Lines run parallel to the outermost edge at the precise location determined by a threshold creating a virtual line to be fit through any imperfection, jag, hanging fibers, peaks (expansion), valleys (indents) to meet predetermined thresholds. Thresholds are fixed/preselected in an algorithm and establish what portion of an edge is defined as Peaks and what portion is defined as valleys (troughs). In one aspect, the system 100 may use up to five hundred measurement points along each edge to measure the Peaks and valleys to determine the number of each, their location, the area of each and the area of the surface of the card that is affected. Additionally the system 100 may be configured to determine if the card outside edge has been cut or altered. The cut or altered edge has a different appearance than that of the other edges or of cards from the same series and/or set when compared to the "Golden Image." The high-resolution image would be able to display the inconsistent appearance of the cut or altered edge. This high-resolution image of the peaks and valleys of the edges contribute (with other unique identifiers) to a "fingerprint" of the card that may be retained in the card Image File.

Image(s) and/or text are typically printed on the front and back surface of a card or collectible 116. The Vertical and Horizontal edges of the image and/or text on the front and/or back (left, right, top and bottom) of a card when looked at from directly above at high resolution will show an imperfect edge of the image and/or text as a result of print error or any aberrations (wandering pixel(s) that stray from the image during the printing process). The system 100 may be configured to establish the vertical and horizontal edge of the image and/or text of a card by fitting a virtual line along the edge of the image and/or text (looking down at the surface of the Subject) from the top of the card to the bottom (vertical image edge) or from the left edge of the image and/or text to the right edge of the image and/or text (horizontal image edge) defined by a threshold permitting that virtual line to be fit through an array of pixels, to meet a predetermined threshold. This process of fitting a virtual line may be identical to the process of fitting a virtual line on the outermost edge for Vertical and Horizontal centering Line.

On occasion, an image may extend to the outermost edge of the card. When this occurs, the Horizontal and Vertical centering Edges may be established at the outermost edge only. Centering is then measured by identifying a specific point on the Golden Image that is in the precise center ("Centering Point") of the Golden Image. That Centering Point is isolated in pixels and placed on the Subject. The system 100 may be configured to utilize high resolution imaging to determine if the Centering Point from the Golden Image is higher or lower (centering top and bottom) and left or right (centering left and right) on the card. This provides the system 100 the necessary data to calculate in Microns or Pixels or other increment what percentage the card image is off-center in any direction and/or that the card may be a possible altered or counterfeit card, as well as a contributor to a fingerprint identification.

When the outermost edge provides a border to the card, image pixel measurement or other image processing methods may be employed to measure the distance between the outer edge of the card and the outer edge of the image, both vertically ("Vertical Centering Lines") and horizontally ("Horizontal Centering Lines"), front and back, as a means of establishing the width of all borders surrounding the image and/or text and thereby measuring the centering of the image and/or text on the Subject, front and back.

Pixel measurement or other image processing methods when used to measure the distance between the outer edge and the peaks and valleys of the card, create an absolute and unique "fingerprint" for that card, thereby permitting the system 100 to guarantee that if a previously graded card is re-examined by the system 100 for authentication, such authentication can be guaranteed and confirmed.

Figure 12A:
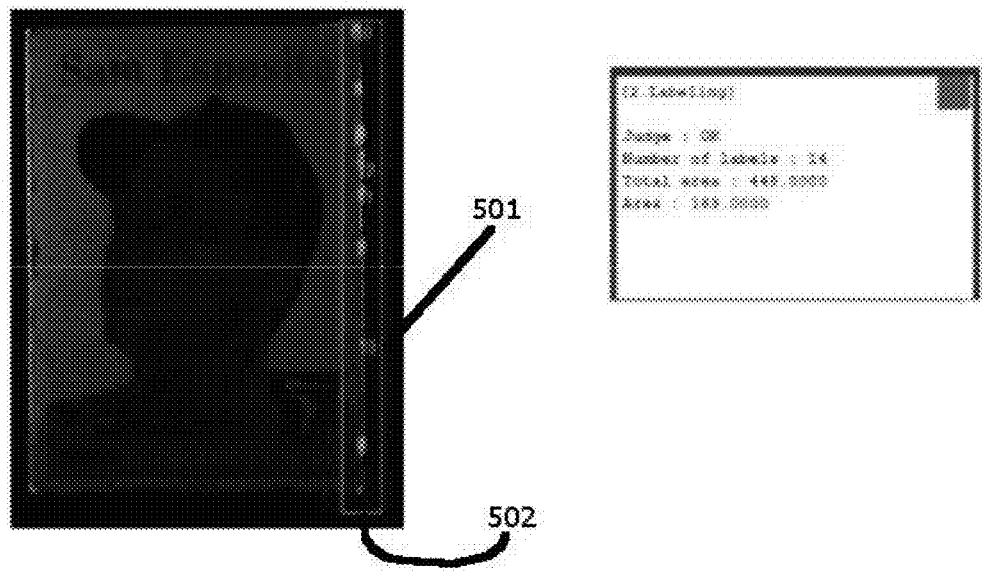
FIG. 12A is a view of a collectible and a partial view of edge grading scores of the grade report from the computerized systems according to an aspect of the disclosure.
Figure 12B:
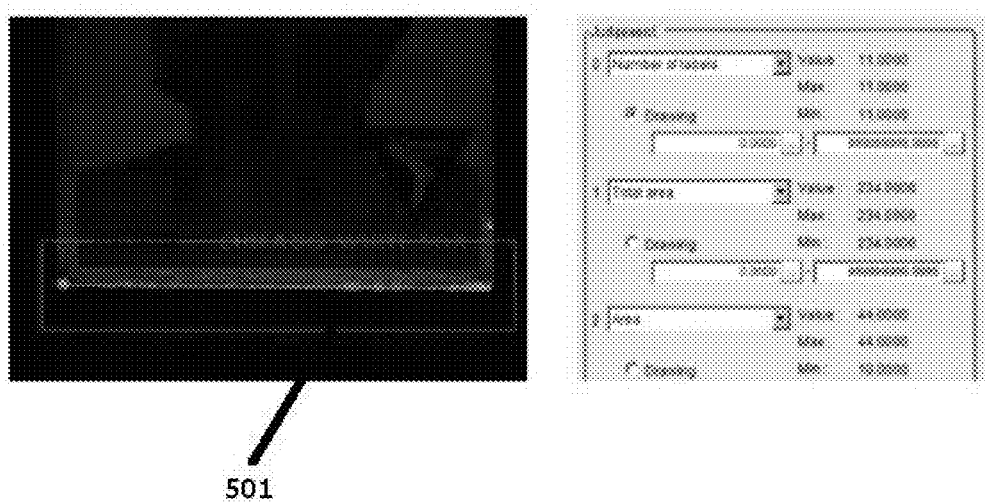
FIG. 12B is another partial view of edge grading scores of the collectible of FIG. 12A.
Figure 13:
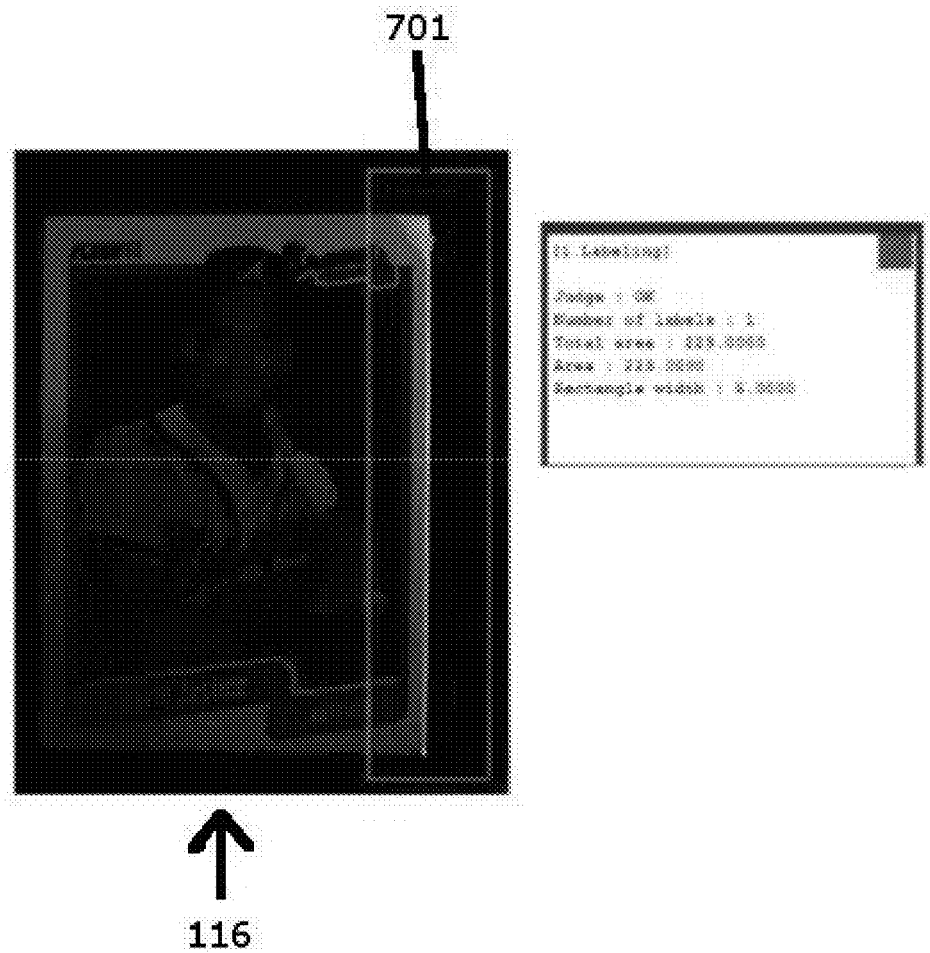
FIG. 13 is a view of a collectible and a partial view of edge grading scores and corner grading scores of the grade report from the computerized systems according to an aspect of the disclosure.

The edges can also be measured using a binary large objects ("blob") analysis, as shown in FIGS. 12A-13. Blob analysis employs mathematical methods to detect regions in a digital image that differ in properties, such as brightness or color, compared to areas surrounding those regions. Informally, a blob is a region of a digital image in which some properties are constant or vary within a prescribed range of values; all the points in a blob can be considered in some sense to be similar to each other. Blob analysis is able to identify, quantify, measure individual defect and cumulative total defects area and report on Subject defects otherwise not visible even with traditional magnification aids.

In one aspect, the computer system 104 utilizes blob analysis in combination with various lighting configurations from above and below and high angle and low angle lighting precisely located relative to the surface of the Subject. Blob analysis, when used as a stand-alone tool measures light diffusion on the edge of a collectible 116, or on the surface of a collectible 116, which will identify and assist in measuring otherwise imperceptible cracks, creases, dents, fraying, chips and scratches. Light sources 114, for example LED lighting, will illuminate the defects that are typically undetectable by other means. Blob analysis may gather data relating to this light diffusion to quantify and measure the area in which the diffusion occurs. Blob analysis may then utilize pre-determined thresholds so that the light diffusion may be identified and measured for authentication and grading purposes. Blob analysis identifies defects in such high resolution that many defects while noted are too small or inconsequential to be of grading value. Predetermined thresholds may be utilized to determine which collectible 116 data collected by blob analysis will be used to later authenticate the collectible 116 ("Fingerprint") for which purpose no defect is too small or inconsequential. These same thresholds may be utilized to determine which defects and data will be used to grade the collectible 116. When the data for grading purposes is determined, they can then be applied to create a collectible grade. If any blob analysis defects are below a size considered in grading and therefore not utilized in the collectible grading scheme, they may nevertheless be stored in the database 130 associated with the collectible image file and, for example, remain available for identification and authentication purposes ("fingerprint") in the future.

FIGS. 12A-B show examples of blob analysis on edges. FIG. 12A shows an example of blob analysis of a vertical edge. There are 14 blobs 501 totaling 448 Pixels in size. The largest blob is 183 Pixels. The blobs are shown within the box 502.

FIG. 12B shows an example of blob analysis of a horizontal edge. There are 11 blobs 501 totaling 234 Pixels. The largest blob measures 44 Pixels.

Blob analysis may be combined with other image processing tools to identify defects on a collectible or card 116. In the card of FIG. 13, angle lighting and blob analysis enables the system 104 to determine that the upper right corner 701 has at one point in time been slightly bent (no crease was incurred by the bend but the image retains visible effect from the bend). This combination of image processing enables the system 104 to determine that the bend was in a downward manner. If the bend were in an upward manner, the corner defect would be darker than the surface of the card 116. Image processing is used to determine the degree of defect in any corner of the card 116 by measuring the area of each corner that does not precisely conform with the Golden image 117 or is not a ninety-degree corner and quantifying that missing area by its number of nonconforming pixels.

Figure 5:
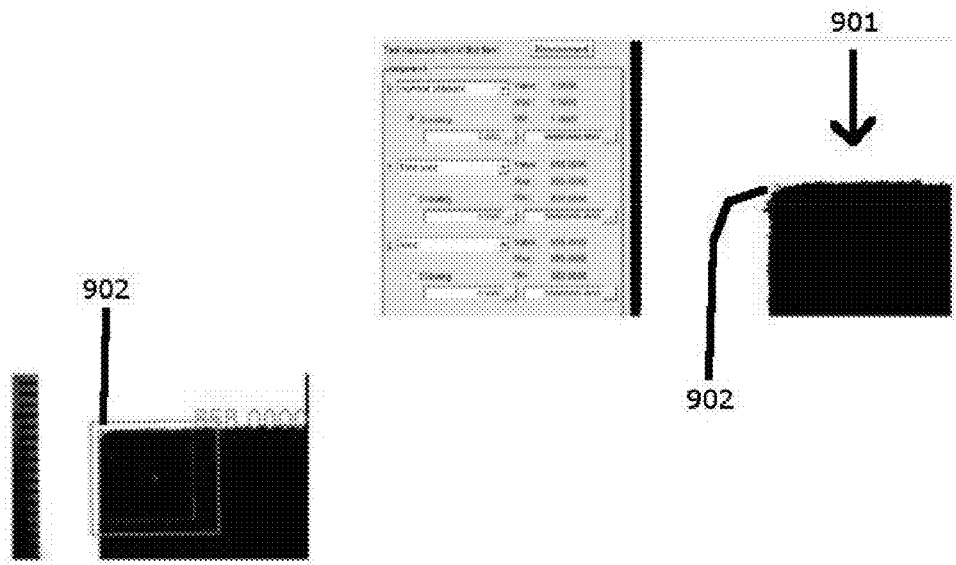
FIG. 5 is a partial view of a collectible and a partial view of corner grading scores of the grade report from the computerized systems according to an aspect of the disclosure.
Figure 6:
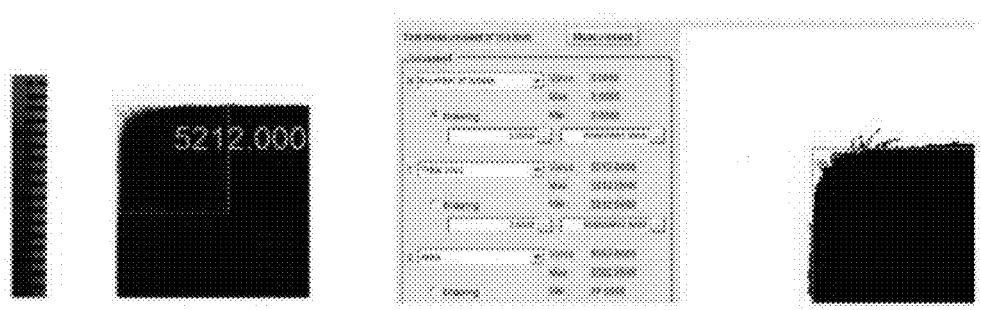
FIG. 6 is a partial view of a collectible and a partial view of corner grading scores of the grade report from the computerized systems according to an aspect of the disclosure.
Figure 7:
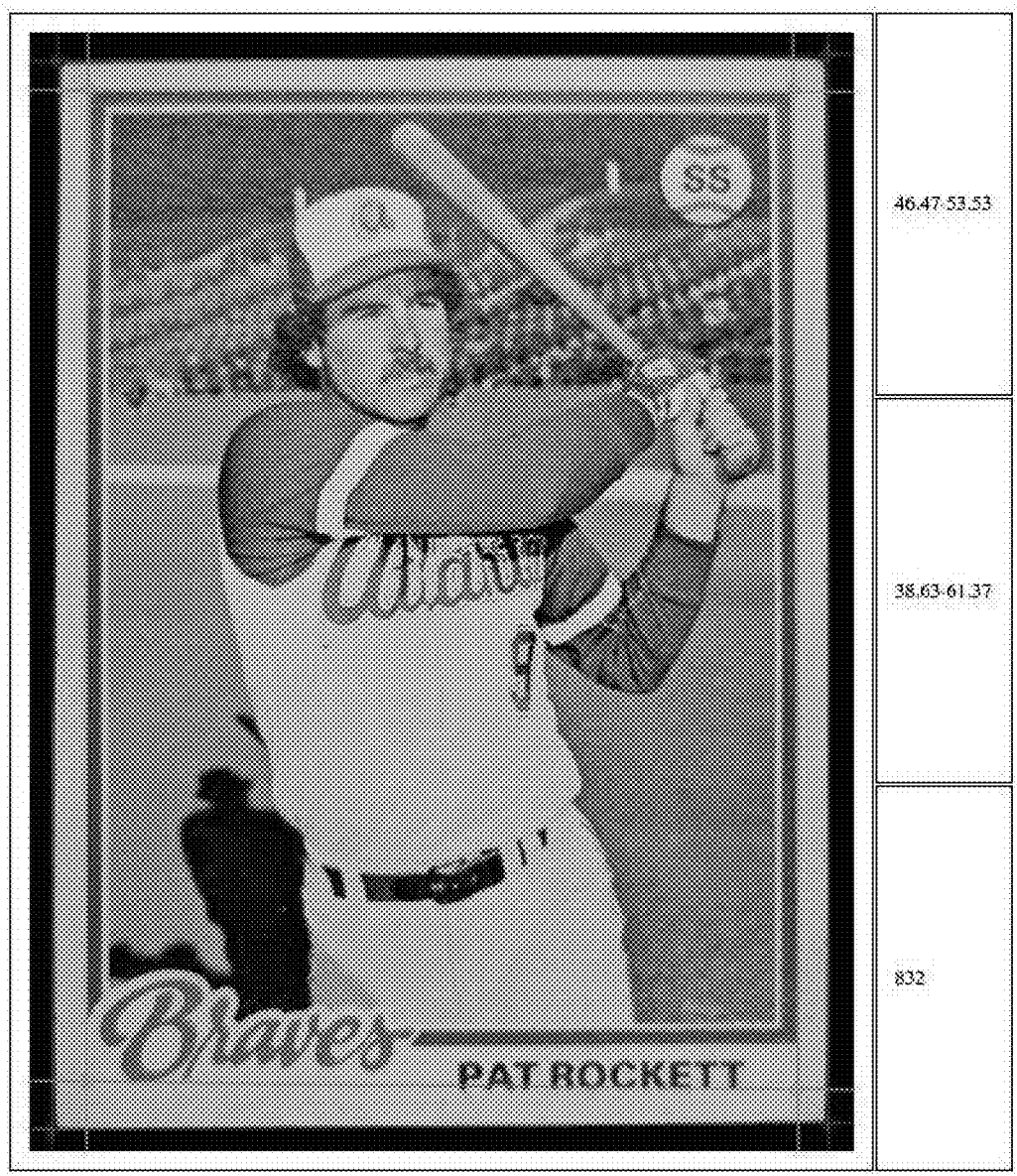
FIG. 7 is a view of a collectible and a partial view of centering grading scores of the grade report from the computerized systems according to an aspect of the disclosure.
Figure 10:
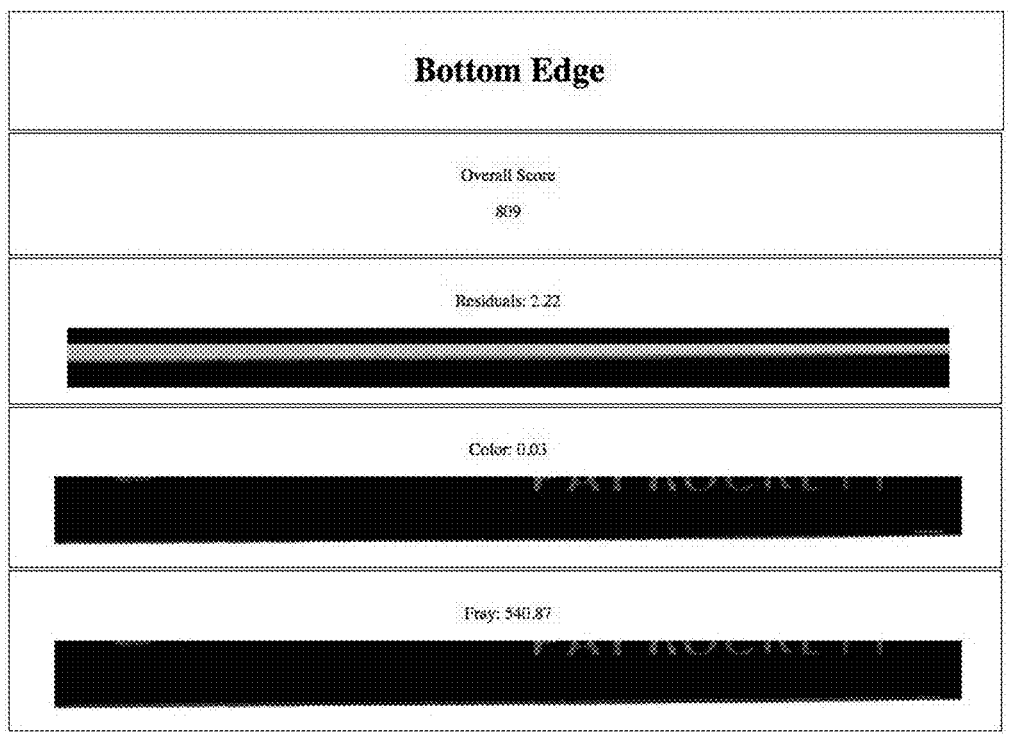
FIG. 10 is a partial view of a bottom edge of a collectible and a partial view of edge grading scores of the grade report from the computerized systems according to an aspect of the disclosure.

As shown in FIG. 13, the card 116 has a corner which has been bent downward. The bent corner measures 223 pixels. FIG. 5 illustrates a corner analysis for a card 116 having a corner defect in its upper left hand corner 901 (from a front viewing perspective). There is one defect 902 measuring 858 pixels in area. To the right, the figure shows the same corner magnified so that the defect may be seen by the naked eye. In this manner, the system 104 determines that the card 116 has a slightly damaged corner—missing 858 pixels from this area. FIG. 10 illustrates a corner analysis for a card 116 having a badly damaged corner. The system 104 identifies an upper left corner that has three defects. The total area of the three defects is 5,212 pixels. The largest of the three defects measures 5,082 pixels. The right-most figure panel shows a magnified view of the same card with the upper left corner defects are now visible to the naked eye. Note the hanging fibers and the Peaks and Valleys that enable system 104 to "fingerprint" this card and authenticate it at a later date as the card originally graded by the system 104.

Figure 4:
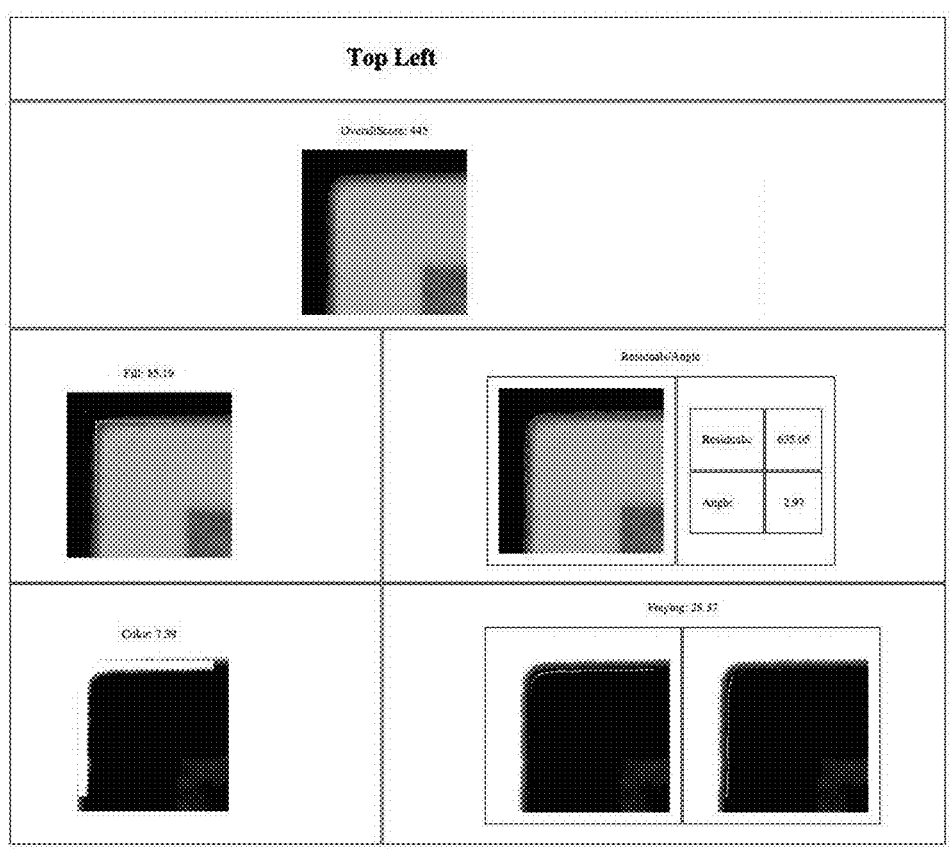
FIG. 4 is a view of corner grading scores of the grade report from the computerized systems according to an aspect of the disclosure.

A centering algorithm, as shown in FIG. 4, can be used to obtain a centering score, based on several component attributes:

a. The margin between the edge of the cardstock and the start of the card image is measured on each of the four sides of the card: the top/bottom ratio is one attribute, e.g., 63.2/36.8 and the left-right ratio is a second attribute, e.g., 40/60.

b. The alignment of the card image relative to the edges of the cardstock is measured and distilled into an angle of rotation for the card image.

An industry-standard mapping of centering-ratios to overall centering-score is then used to find the overall centering-score for the card. For example, horizontal centering lines and horizontal centering edge are determined, and the system 104 can, for example, use up to 100 measurement points along the lines measuring the distance between the lines and resultantly any image slope (slant in the printing of the image on the card) associated with the image on the card. This calculation may be performed on Horizontal Centering Lines and Vertical Centering Lines to determine the width of the border on all sides of the image of the collectible 116. The system 104 calculation identifies the degree of off-centeredness of the image of the collectible 116 as well as the pixel variance on each border between the largest width and the narrowest width and compares them to the Golden image 117 to confirm they are defects. Thresholds may be applied and grading defects thereby determined. Defects outside the grading thresholds may be stored in the image file in the database 130 for authentication purposes, if needed, at a later date.

Figure 8:
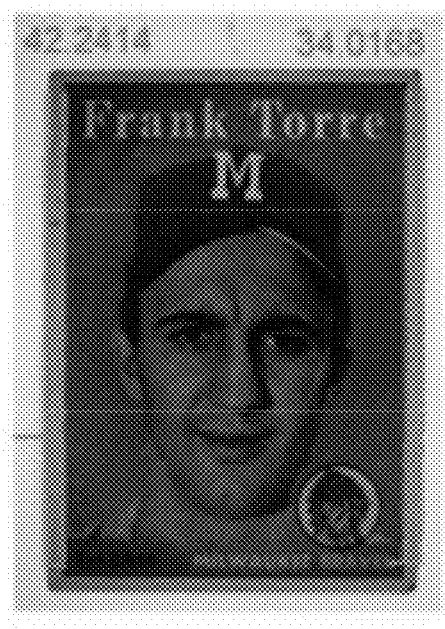
FIG. 8 is a view of a collectible and a partial view of centering grading scores of the grade report from the computerized systems according to an aspect of the disclosure.
Figure 9:
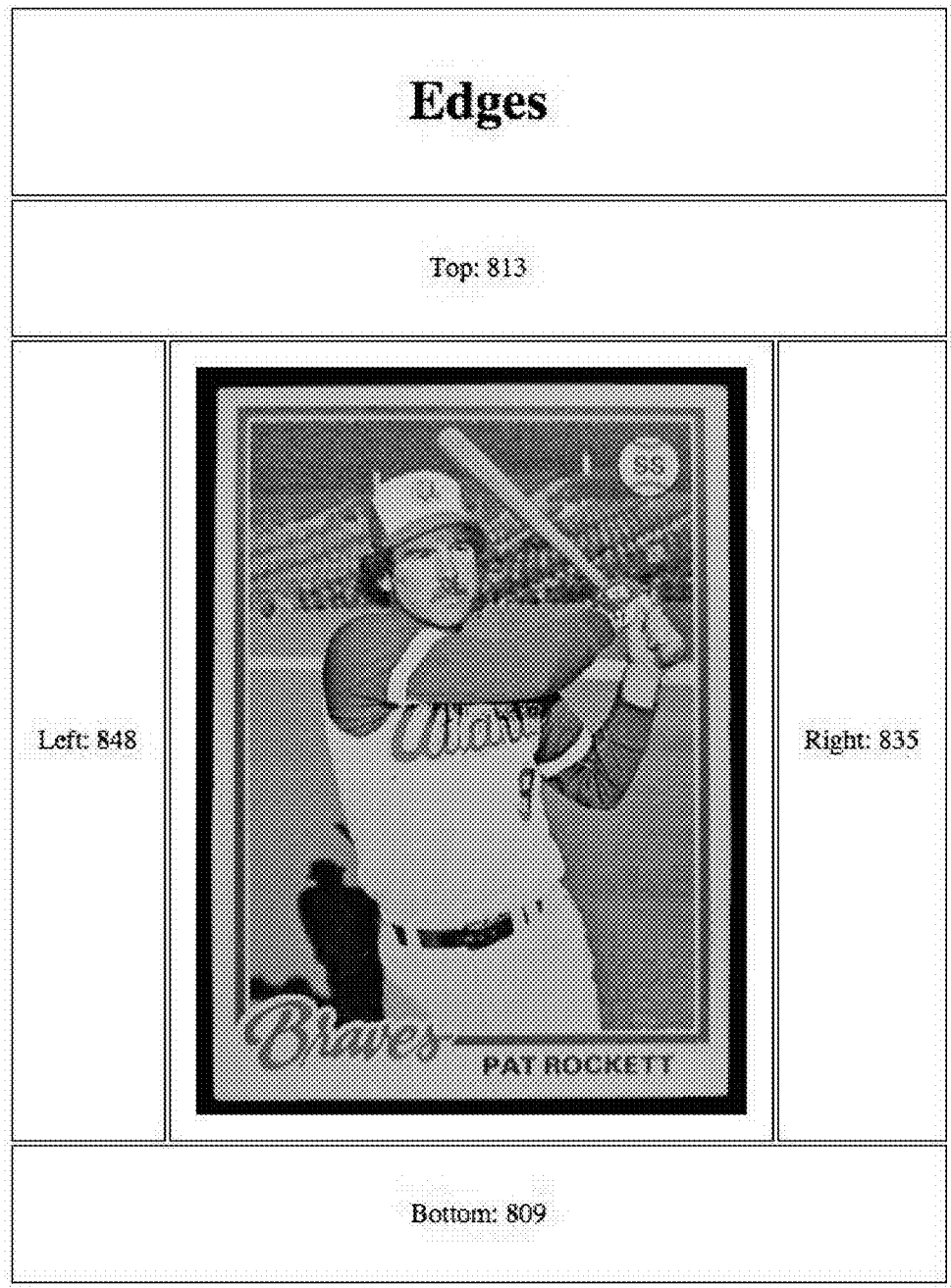
FIG. 9 is a view of a collectible and a partial view of edge grading scores of the grade report from the computerized systems according to an aspect of the disclosure.

FIG. 8 illustrates an example of an image centering analysis according to an aspect of the disclosure. The left margin of this Frank Torre baseball card shown in FIG. 8 is determined to be 42.2414 pixels wide=55.39%; while the right margin is determined to be 34.0168 pixels wide.=44.61%. Therefore, the L/R margin ratio is 55.4/44.6%.

A surface algorithm seeks to give each object card a score based on the condition of the central surface of the card. Specifically, it downgrades this score based on, among other defects such as slope, the following card conditions:

a. Tape, glue, or other materials are affixed to the card 116, e.g., from prior mounting or accidental contact. In addition, ink, pencil, or other markings can detract from the overall grade of a card.

b. Scratches, creases or missing layers of the image or cardstock can also detract from the surface of the card. Removed staples and pinholes, e.g., from thumbtacks leave punctures in the cardstock.

c. Fading of color of gloss of the image, and/or misprinting errors also reduce the surface score of an object card.

In order to detect the many different types of surface defects, the system 104 compares the images taken under several distinct lighting conditions. These different lighting conditions accentuate the physical condition in the collectible 116 in order to detect the many different types of defects that could be present in a collectible. The computer system 104 compares the images taken under the different lighting conditions, and since the collectible 116 was stationary while the images were taken resulting in substantially aligned images, alignment of features from one image to another is made much easier: template-matching can align the images' features within one pixel—and, many times, to a precision greater than that. Even with no external template (that is, a database image) the difference in images between those lit from one side of the card and the other will reveal creases and other subtractive defects (pinholes).

In order to detect defects, the card needs to be compared to a template image, or in the absence of a template, portions of the card can be compared directly to other areas from the same image or a similar image, e.g., a different card from the same series. Each of the defects found, if any, would reduce the overall surface score for the card through algorithms consistent with standard card-grading practice.

Figure 14:
FIG. 14 is a partial view of a collectible and a partial view of surface grading scores of the grade report from the computerized systems according to an aspect of the disclosure.

FIG. 14 shows an example of a blob analysis combined with other image processing algorithms to identify defects in the card. There are 9 measurable areas on a crease line 1101 measuring 838 pixels in total area and 394 pixels of area in the largest crease area. The smallest crease area is 32 pixels. If the threshold for creases were established at greater than 32, the smallest of the blob creases would be stored in the card image file for authentication ("fingerprinting") purposes at a later date, if needed, but the 32 pixel crease would not be utilized in grading this card. However the thresholds are set, the blob analysis may be applied consistently across all cards to give consistent grading of cards.

The system 100 can be configured to employ Optical character recognition ("OCR") to read the image and/or text on a collectible 116, and convert it into identifiable and readable text. Thus, the system 100 may use OCR or readable text to identify the collectible 116 in order to automatically locate its Golden Image 117 in the Golden Image Library or elsewhere in stored images (i.e., Subject Image File). The converted text can also be used to compile any other text data on a collectible (e.g. team, town, statistics, date, number, manufacturer, country, names, locations, etc.).

The system 100 may alternatively or also be configured to provide for Manual Input of a collectible 116 identifying data should it be a unique collectible or be otherwise unknown within the database 130. The system 100 may alternatively, or in addition, be configured to use Image Recognition technology known in the art to identify or match the collectible 116 with its corresponding Golden Image 117 file.

The system 100 may be configured to analyze the coloring of the collectible or card 116 and compare it to the Golden Image 117 using RGB (red, green blue) values for its color data. The red, green and blue coloration of each subject image may be evaluated and described as an average value for each color or for all the colors combined. The color data for each color of a collectible is then compared to the Golden Image color data to determine how much the colors of the collectible vary from the colors of the Golden Image. The result is displayed as the "Color Difference" which represents an average difference of the red, green, and blue values and may be stored in computer-accessible computer memory or the database 130.

The system 100 may be configured to accurately measure the thickness of a card or collectible 116, for example, with a sensitivity of 0.25 microns, for the purpose of determining: if the card is counterfeit and on paper stock dissimilar from the Golden image 117; if the card has been "pressed" in an attempt to remove a surface crease; if the card has had one or more corners pressed in an attempt to "press" lifting of corner stock; and, if the card is a previously graded card by the system 104. For Example, this measurement may be performed using a Confocal Fiber Displacement Sensor which uses LED lighting (with which the imaging device 106 is equipped), without contact with the card, to more precisely measure the thickness than previously available technology such as laser triangulation. Thickness measurement may also be performed by other non-contact methods known in the art, such as terahertz time-domain spectroscopy (see Mousavi et al, *Simultaneous composition and thickness measurement of paper using terahertz time-domain spectroscopy*, Applied Optics, Vol. 48, Issue 33, pp. 6541-6546 (2009)) and multiwavelength THz interferometry (see Nguyen et al., *Optical thickness measurement with multiwavelength THz interferometry*, Optics and Lasers in Engineering, Volume 61, October 2014, Pages 19-22).

The above sections describe how the system arrives at an object-card score for each of four large grading criteria: Centering, Corners, Edge, and Surface (including color and gloss). From those four scores, measured on a 0-1000 scale, say, a single overall score for the card is computed based on the weighting determined by proprietary algorithms and that is standard in the card-grading industry. Because the usual output is provided on a scale from 0 to 10, the system can scale its overall score to that range or any other range selected.

In order to display its processing results to an output device 122, the system 104 generates a grade report, for example in HTML, creating each score (and all of their component attributes) as quickly as possible, and swapping the actual results for their placeholders as they become available. The use of Javascript and its many libraries, e.g., AJAX, makes that swapping possible. By the end of the analysis, the user has access to all of the attributes, scores, raw scores, and overall score from the system. In addition, the images of the card and grade report for the card is added to the database 130 in order to improve future reasoning about identity or quality of scanned or camera-produced images. In addition, storing the card images in the database 130 enables the system 104 to identify individual instances of cards, for authentication and to facilitate alteration detection and/or counterfeit detection.

Figure 3:
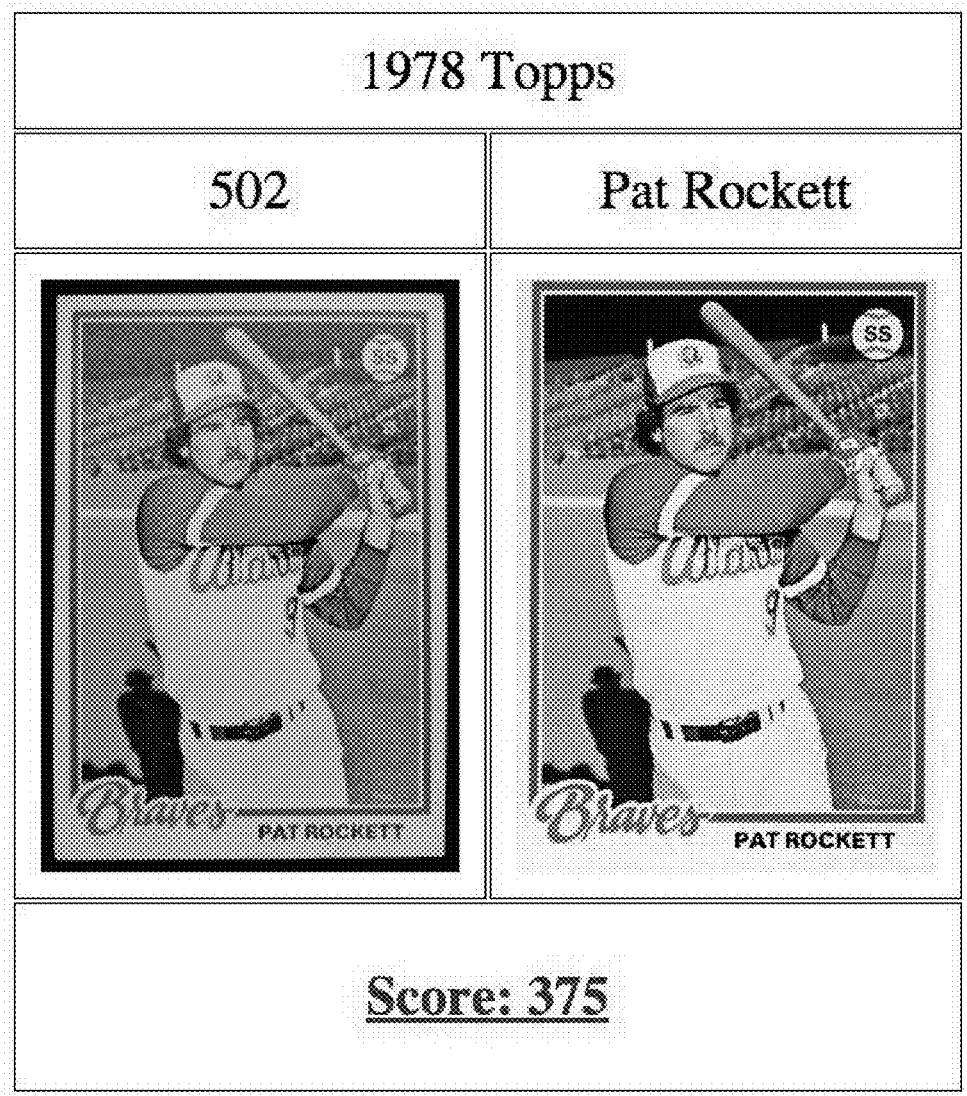
FIG. 3 is a view of part a grade report from the computerized systems according to an aspect of the disclosure.
Figure 11:
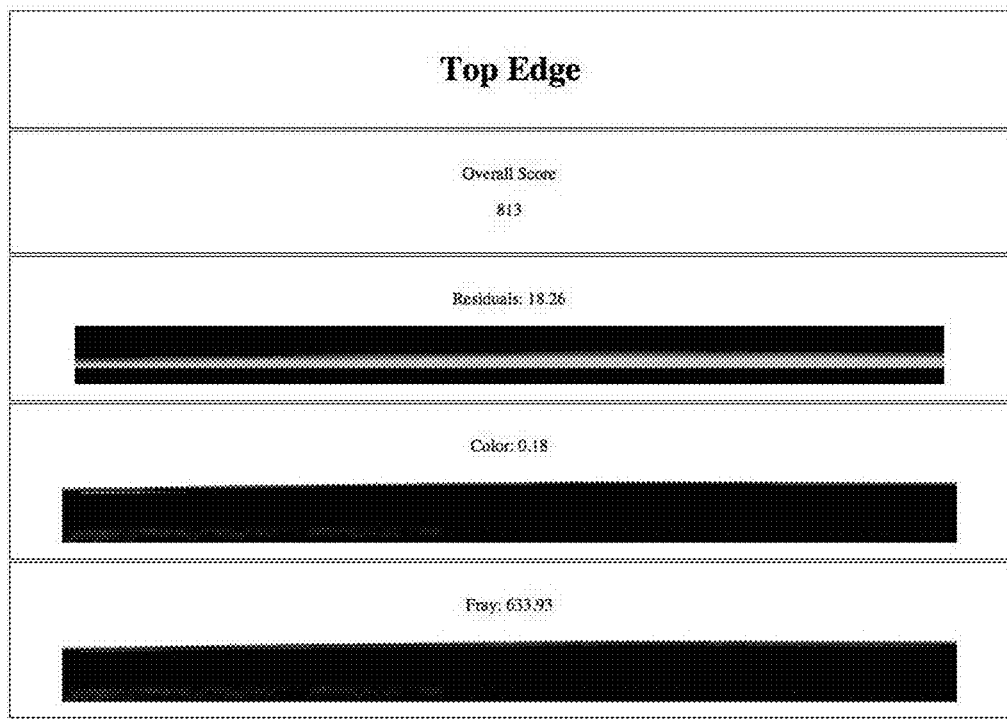
FIG. 11 is a partial view of a top edge of a collectible and a partial view of edge grading scores of the grade report from the computerized systems according to an aspect of the disclosure.

FIGS. 4, 7, 9, 10 and 11 provide examples of card grading reports that provide scores of the centering, corners, edges, and surface along with the overall score card grade in FIG. 3. The Golden image 117 of the card 116 is also provided along with the image of the graded card 116. The centering analysis and score is displayed in FIG. 7. The score report for the edges is displayed in FIG. 9. A score report for the corners is presented in FIG. 4. A score report for the edges is presented in FIG. 11, wherein defect areas on the edges are magnified in a box, as shown in FIG. 11.

Figures 15A, 15B:
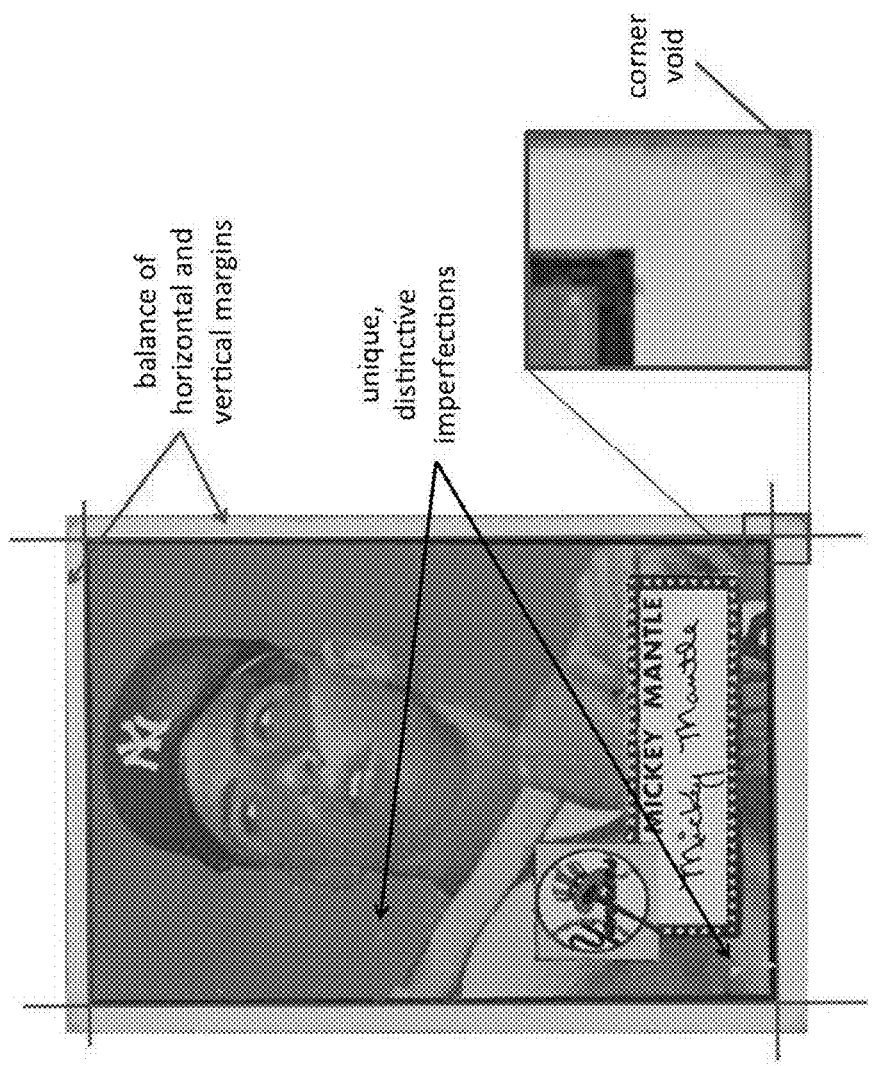
FIG. 15A is a view of a collectible and a partial view of corner grading scores and surface grading scores of the grade report from the computerized systems according to an aspect of the disclosure.
FIG. 15B is a partial view of the collectible of FIG. 15A.

With individual instances of scanned cards or collectibles 116 available in the database 130, the system 104 can use the same techniques described above to solve or facilitate—authentication of three types:

a. By comparing at least one of the: centering, corner, edge, and/or surface attributes, the system 104 will be able to distinguish different instances of identical cards 116, e.g., two 1963 Topps Mickey Mantle cards. (See FIGS. 15A and 15B). Only the identical card would match a previously graded image and stored instance in all of those attributes closely enough to be considered identical. This contributor to fingerprinting allows for re-identification of a particular collectible.

b. Some of the surface algorithms will be able to flag portions of a card that have been intentionally altered in order to artificially raise its grade. For example, inpainting (color alteration) is a kind of additive surface defect made to cover over another imperfection in a card.

c. The database 130 can store any geometric or other metadata about each card 116, so that all of the known counterfeit identifiers can be flagged.

The system 104 can comprise a graphical user interface on the output device 122 that allows a user, through customary mouse motions and other input gestures, to specify the locations in a card where the system would check for known discrepancies that would signal a possible counterfeit.

The computerized system 100 creates an image file of the collectible 116 and this file may be stored in the database 130 in remote network-linked computer memory devices, and remain accessible to the computerized system 100 and its customers. The collectible 116 image in the database 130 is also a "fingerprint" of the collectible 116. In the images stored at the resolution used by the system 100, the corners and centering are unique and cannot ever be reproduced or counterfeited. The computerized system 100 can measure and capture an image of a corner and/or the centering (width of image borders horizontal and vertical) in such detail that the corner and centering of the image on the collectible or card 116 could always be confirmed in the future. The computerized system 100 measures the edge of each collectible 116 precisely such that the system 100 is able to identify "peaks" and "valleys" on each edge. These peaks and valleys are unique and can never be reproduced or counterfeited. By retaining a high resolution image of the graded collectible 116 a person at any time in the future can send the collectible 116, or its image via any electronic means, to be authenticated by the system 100 and confirm that the collectible 116 is the same collectible 116 as originally analyzed and graded. A person may also confirm that the collectible 116 of inquiry is not a counterfeit of the original collectible 116.

At least one advantage of the disclosure is that a graded card or collectible 116 can be authenticated, while the card is either within or removed from its original grading holder, at any time after the initial grading. This provides the added security to ensure that the card being authenticated or regraded is the identical card that was originally graded by the disclosure. The disclosure provides a higher security measure over conventional grading companies, which typically issue a serial number to the card they grade, and/or a certification that the card was graded by them. Conventional grading companies retain a database of the serial numbers for the cards they have graded, but do not retain images of the graded card detailing the physical condition of the card and/or defects at the time the card was graded (a card "fingerprint"). Cards graded under conventional processes can be resubmitted until a desired high grade is obtained. The high grade is obtained due to different humans examining the card. The disclosure will identify that a card has been graded and provide a grade that is identical or consistent with the original grade. The subsequent grade could be lower than the original grade if the condition of the card has changed since it was originally graded. As such, the disclosure prevents the inflation of grades of cards.

Yet another advantage of the disclosure is to further assist the market place in discerning whether a collectible 116 is counterfeit or has been replaced with another collectible. For example, a card that is not a counterfeit, but is not the identical card that was originally graded. The system 100 may maintain ownership data for each collectible 116 and this information may be stored in a correlated manner with the "fingerprint" image, for example in a data structure such as the database 130. In one aspect, a person may be granted access to the database 130 and confirm that the owner of the collectible 116 is as represented by a third party. This feature permits a buyer of a collectible 116 to confirm that the collectible 116 is authentic and that the seller is the legitimate owner. With each transfer of ownership, a recorded owner and a buyer together will have access to update the ownership record in the database 130.

In one aspect, the computerized system 100 uses a 1,000 point grading system and converts data collected by image processing to a numeric score and a standardized grade. For example, a 1,000 point max scale may be reduced by thresholds and applied algorithms such that the final score is 815. The 815 may be reported at 81.5 or 8.15 and with the applicable grade for an 815 score (i.e., Perfect, Pristine, Gem Mint, Mint, Mint/Near Mint, Near Mint/Excellent, Excellent/Good, Good/Fair/Poor, etc.). Unlike other grading companies, the computerized system 100 may be configured to provide a grade report comprising a detailed defect report itemizing any deduction in score. The grade report can also comprise a detailed image report that will show an image of the collectible 116 with the location of noted defects identified. The grade report may also be configured to provide a provenance report and authentication report in order to eliminate counterfeiting and fraud (alterations). This 1,000 point grading system also provides an opportunity for collectible 116 owners to differentiate their graded collectibles 116 by score and/or grade report. Thus permitting two collectibles 116 graded with the same standardized grade (Mint/Near Mint for example) to differentiate their collectibles 116 and more precisely determine relative value. Additionally, people who value certain type defects differently may differentiate between collectibles 116 both scored the same (815 and 815, for example) but with different defect attributes. For example, because general eye appeal may be an important component of value for a particular buyer and "beauty" is in the eye of the beholder, one collector may value good corners more than centering or gloss than another does and will be able to discern the grading details to exercise his/her preference.

The computerized system can be configured to prepare various types of reports and is not intended to be limited to only producing grade reports. In some aspects the computerized system can be configured to prepare and/or produce a plurality of reports based on the information stored in the database 130. In some aspects, the computerized system can be configured to prepare a population report of all the collectibles that have been graded by the computerized system.

A population report can be derived from various data points and/or metrics stored in the database. In some aspects, the data points and/or metrics can comprise the year the collectible was created, manufacturer of the collectible, the main subject of the collectible (i.e. baseball player on the card or other player), number of the collectible from a series of collectibles, sport of the collectible, awards received by the main subject or player (i.e. Most Valuable Player, Rookie of the Year, etc.), individual statistical information (e.g. batting average, earned run average, etc.), and/or championships won. This list is a non-exhaustive example of possible data points and/or metrics that could be used to formulate the population report, and the disclosure is not intended to be limited to the non-exhaustive example disclosed herein. Persons skilled in the art would understand the vast variety of possible data points and/or metrics that could be used to formulate the population report.

In some aspects, the data points and/or metrics can comprise many different characteristics that are related to the collectible. In the non-exhaustive example provided herein, the types of data points and/or metrics listed of the collectible are those related to baseball cards, but the disclosure is not intended to be limited to baseball cards. The types of data points and/or metrics are not intended to be limited to baseball cards, and can be directed to many different types of collectibles, such as, but not limited to, football cards, basketball cards, hockey cards, stamps, coins, photographs, and/or any other type of collectibles.

Figures 18, 19:
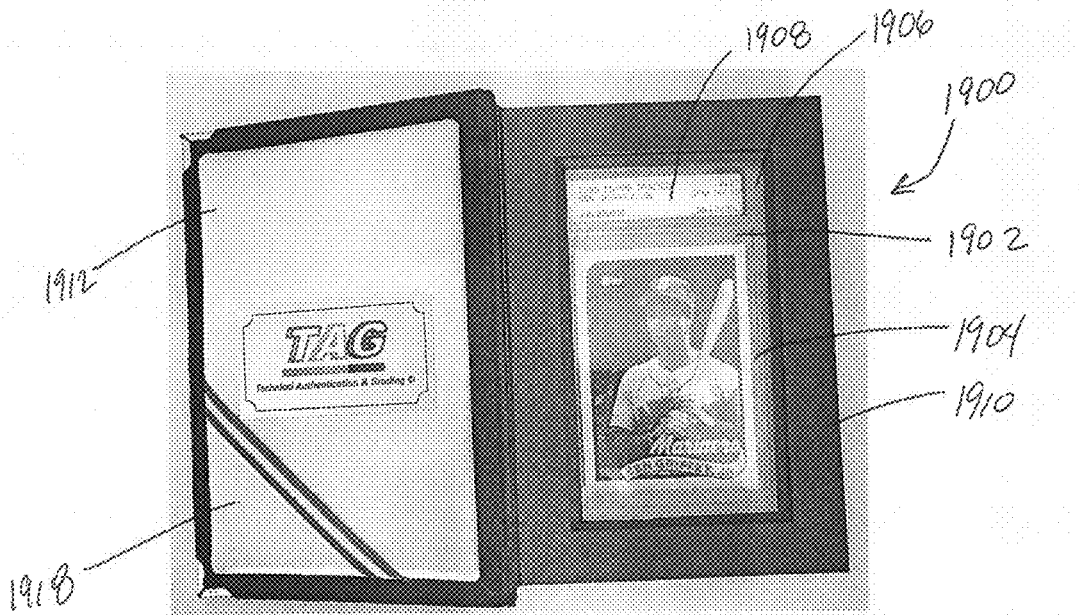
FIG. 18 is a view of a population report according to an aspect of the disclosure.
FIG. 19 is a perspective view of a casing of a collectible according to an aspect of the disclosure.

FIG. 18 shows a view of a population report 1800 for particular baseball cards based on selected criteria. The population report 1800 is derived from and gathers the grades from all the cards graded by the computerized system. The computerized system assembles the population report 1800 based on selected criteria and outputs the report 1800 showing the total number of graded cards that meet the selected criteria.

The report 1800 can also arrange the cards by grade, such that the results can be arranged to show the number of graded cards by range of grade. For example, as shown in FIG. 18, the range of graded cards can be as follows: Poor (PR), Fair (FR), Good (GOOD), Very Good (VG), Very Good-Excellent (VG-EX), Excellent (EX), Excellent-Mint (EX-MT), Near Mint (NM), Near Mint-Mint (NM-MT), Mint (MINT), Gem-Mint (GEM-MT). The population report 1800 shows how many of each card has been graded and tallies them by grade.

At least one advantage of the disclosure is that the population report 1800 provides an accurate count of cards by grade and will also account for cards that have been submitted for regrades. In conventional reports, when a card is re-submitted to be re-graded, which is very common in the industry, the prior grade is not replaced by the new re-grade value and is thus counted multiple times, such that conventional reports do not account for cards that have been submitted multiple times for grading. As such, conventional reports do not show an accurate count of the number of graded cards because cards re-submitted for re-grade are counted as new cards and there is no way to determine whether a card has previously been submitted for a grade.

As discussed above, the computerized system can determine if a card has been submitted previously for a grade, such that if a card is identified by the computerized system as a card that has been previously submitted for grading, then the previous grade will be replaced and/or updated with the new grade. The computerized system can also store the number of times a card has been re-submitted for grading. As such, the population report 1800 of the disclosure provides an accurate number of graded cards because the computerized system of the disclosure can detect and/or account for re-submitted cards. Conventional reports have inaccurate card counts because cards are repeatedly re-submitted for re-grading until the card has achieved the highest possible grading, which in turn leads to multiple grades for one card and gives the impression that there are more cards than what have actually been graded.

In some aspects of determining if a card has been previously graded by the computerized system, the computerized system will capture one or more images of the card, as would be done for any card during the grading process. The images are then transmitted by the image acquisition device, such as but not limited to, a scanner, to a processor, wherein the processor will apply one or more image processing routines to the one or more images. As a result of the one or more image processing routines, defects and/or imperfections are identified on the card, and the computerized system can run a comparison analysis on results of previously graded cards that are stored on the database. If a previously graded card is found to have the substantially similar defect and/or imperfection, then the computerized system will mark the card being graded as a potential resubmitted card. In some aspects, the computerized system can further analyze the potential resubmitted card with the previous results to ensure that the card under examination has been previously graded. Such further analysis can comprise a comparison of physical condition of the cards, such as but not limited to quality of corners, physical dimensions, same image on cards, centering of image on card, and/or any other items disclosed above in Table 1. In the event that such a card is determined to be a resubmitted card, then the previous grade report of the resubmitted card is updated with the results of the re-grade. The grade report can also be updated to indicate that the card has been resubmitted for grading, as well as the number of times the card has been resubmitted for grading. This allows the computerized system to ensure an accurate accounting of the number of cards that have been graded by the computerized system. As discussed above, it is common for cards to be resubmitted for grades until the highest possible grade for a card is attained, but conventional grading systems do not account for a card being resubmitted for grading and thereby do not have an accurate record of the actual number of unique cards that have been submitted for grading. At least one advantage of the computerized system is that it can provide an accurate accounting of the number of graded cards, and can detect when cards are being resubmitted in an attempt to get a higher grade. This can instill confidence into the computerized grading process because the subjective human element is significantly reduced and/or eliminated, and making the grading process more objective.

In some aspects, the computerized system can determine if a resubmitted card has been altered from its physical condition from the previous time it was submitted for grading. For example, if the card when originally graded had rough edges and/or corners, but when resubmitted has straight edges and/or straight corners, then the computerized system will be able to analyze the card to see if the dimensions have changed to reflect that the card edges and/or corners were cut in an attempt to improve the edges and/or corners of the card. Such information can be included in the updated grade report. In another example, if the originally graded card had missing color along a portion of the card (due to frayed corners/edges, or other reason), but when resubmitted, the card does not have the same missing color, the computerized system can determine if the card was altered by adding coloring to the portion of the card. In yet some aspects, the computerized system examines the centering of the image to determine if the centering of the image has been altered since last submitted. The computerized system can perform a centering analysis, as discussed above, to determine the separation of the image from the edges and if the separation has changed since last graded, then the computerized system can detect the change in centering, and can thereby determine that the card has been altered since it was previously graded. In yet some aspects, the corners are examined to determine whether the corners are in the same condition as before.

In the aspect of FIG. 18, the range of grade for the cards had a high value of Gem-Mint. However, the disclosure can provide the additional grades of Proof and Near-Proof. These additional grades are intended to be higher than the grade of Gem-Mint, which is the current highest grade available.

The grade of Proof is for a card that is determined either electronically or manually to be "perfect" by definition with no identifiable defect. This determination is made prior to card ever being touched by human hands either by the card being placed on a scanner by gloved hands directly from manufacturer's printing process, or by acquiring a previously unopened package of cards, or by having a scanned image captured directly from the manufacturer's printing process during manufacturing, or by acquiring a previously unopened package of cards. If manually graded, a grader wears gloves prior to grading and prior to the card ever being touched by human hands.

The grade of Near-Proof is for a card that is an otherwise Proof-graded card but graded in a manner that cannot assure that the card has never been touched by human hands (unprotected). As such, the Near-Proof card is substantially similar in quality to a Proof card, but cannot provide assurance that the card was handled in a protected manner when being graded.

As discussed above, the grading scale can range from 100-1000, and in some aspects, the grades of Proof and Near-Proof can fall within the 100-1000 scale. However, in some aspects, the grades of Proof and Near-Proof extend beyond the 100-1000 scale. In some aspects, the grades of Proof and Near-Proof can fall within the range of 951-1000. In yet some aspects, the grade of Near-Proof can have a range of 951-1000. In some aspects, the grade of Proof can have a range of 976-1000.

Figure 20:
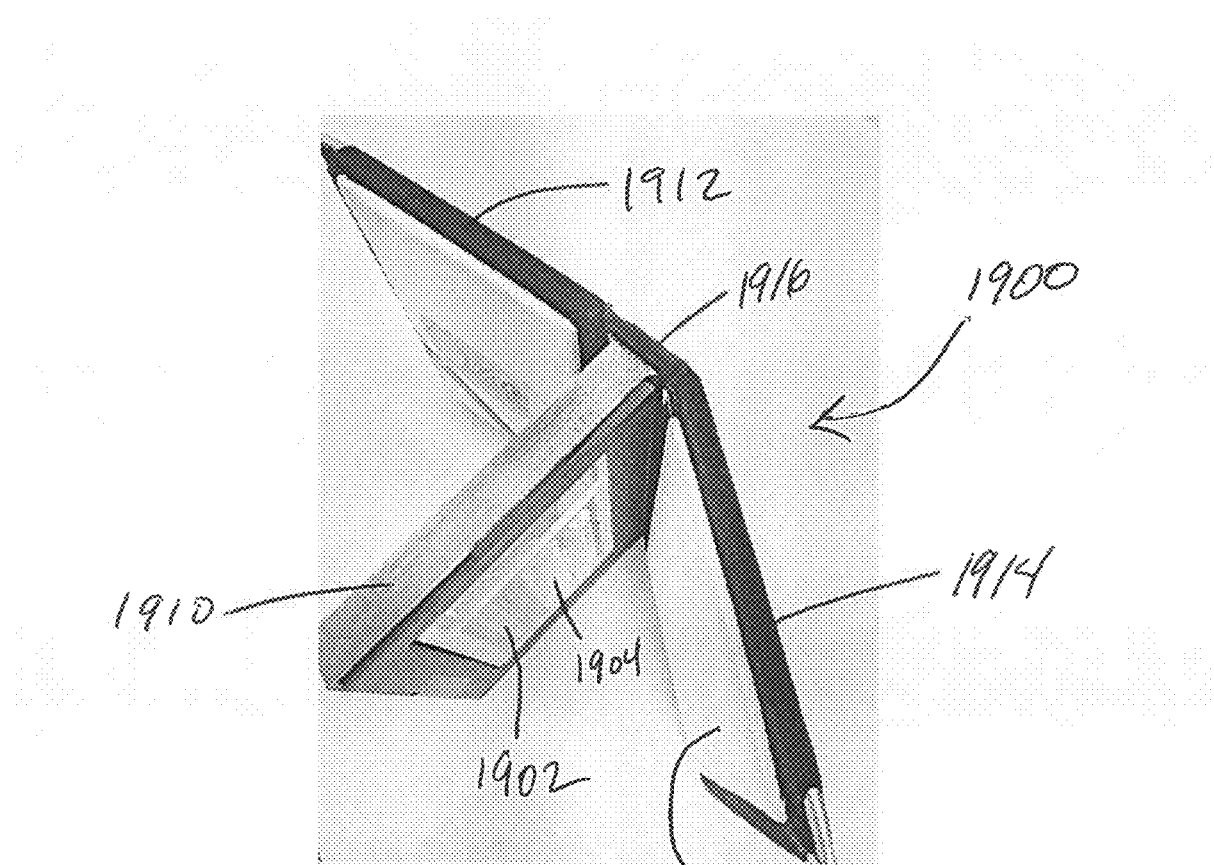
FIG. 20 is an overhead view of the casing of FIG. 19.

In some aspects, cards that have been graded as Proof or Near-Proof can be specially encased in a protective casing 1900, as shown in FIGS. 19 and 20. The casing 1900 can appear as a book-type configuration, wherein the collectible is encased within a transparent slab 1902 comprising a lower compartment 1904 for the collectible and an upper compartment 1906 for a flip 1908. The flip 1908 comprises information related to the collectible, such as but not limited to, the grade, the manufacturer, the year of manufacture, an identifying mark (i.e. bar code, serial number, or the like). In some aspects, the flip can also comprise some selected and/or desired metrics that are directed to external characteristics and/or features of the collectible. For example, some of the external characteristics that can be listed on the flip are statistical metrics of the player on the collectible for the year of the collectible, any awards received by the player for the year of the collectible or during their playing career, as well as team accomplishments (i.e. championship(s) won, season records, and/or the like).

The protective casing 1900 can comprise a central body 1910 that receives the slab 1902 with the collectible, a front cover 1912, a back cover 1914, and a spine 1916, wherein the front cover and/or the back cover are hingedly coupled to the spine 1916. The central body 1910 can be coupled to the spine 1916 such that the central body is affixed and stationary. The front cover and/or the back cover can further comprise a padded section 1918, such that the padded sections contact the central body 1910 when the front and back covers are closed, such that the padded sections and the front and back covers provide a protective cover to opposite surfaces of the central body 1910. The protective casing described is merely exemplary and may be designed and configured differently, and is not intended to be limited to the aspects disclosed herein.

The protective casing shown in FIGS. 19 and 20 can also be used with any graded and/or non-graded card and is not intended to be limited to only be used with Proof and/or Near-Proof cards. As such, users could place any card within the protective casing as desired.

Figure 21:
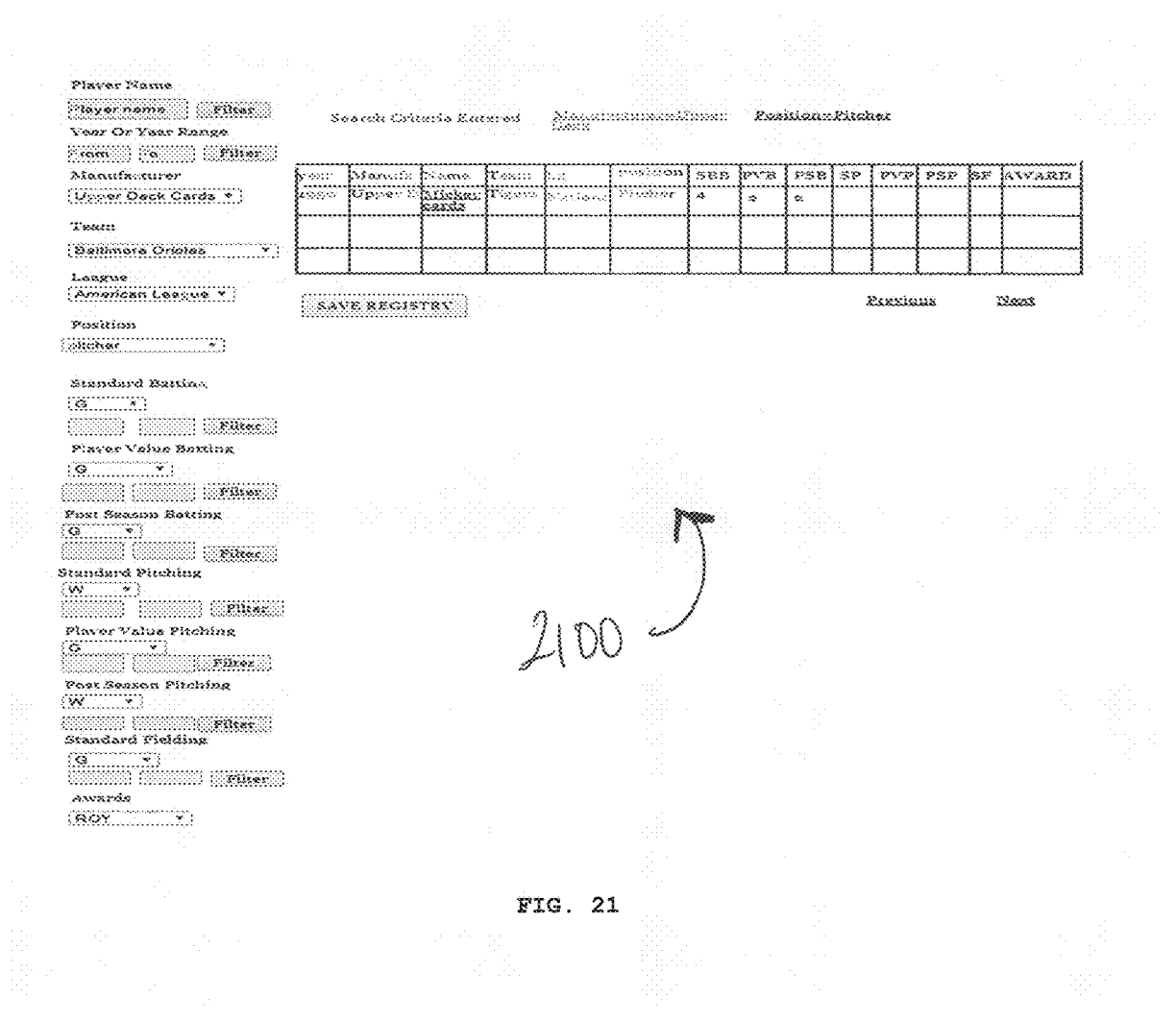

FIG. 21 shows a view of a customized set registry report 2100 of particular collectibles, such as but not limited to baseball cards, based on selected criteria. The customized set registry report 2100 is yet another report that can be created based on the information stored on the database 130. The customized set registry report 2100 can identify existing cards that are selected by statistical data, metadata, and/or other criterion, including sabermetrics (advanced performance statistics). The customized set registry report 2100 can utilize performance statistics to identify players (qualifying players) who have reached a selected level of performance (filter) either for any season or for all or part of a career. Multiple filters may be used without limitation to narrow or broaden the number of qualifying players.

The customized set registry report 2100 can be displayed on the output device 122 or can be displayed on a remote output device that is connected to the computerized system, such as but not limited to a network connection, such that the customized set registry report 2100 can be accessed and/or displayed on an output device 122 that is remote from the computerized system. The customized set registry report 2100 can be shown on an output device, either remote or local to the computerized system, on a graphic user interface in response to instructions received by the computerized system.

As discussed above, metadata is collected and/or attributed to collectible or cards as they are being graded. Metadata that has been collected of a graded card can be utilized in creating the customized set registry report. Metadata can refer to many different descriptive features of the card, player information, statistical information, manufacturer of the card, year of the card, number of card, name of series that the card is a part of, career statistics and/or awards, team statistics and/or awards, special characteristic of card (i.e. limited-edition card, first ever card, autograph, and/or special insert embedded within card, premium card, semi-premium card, or most common cards), and/or the like. The computerized system can gather and compile a vast array of information for each player and store it, making it accessible to create Customized Set Registries, whereby a customer may create, using filters, a personalized list and/or collection of cards which meet their criteria. For example, one may wish to accumulate a collection of cards of Pitchers from 1957 to 1973 in the National League with more than 100 wins, more than 300 strikeouts, and an ERA of less than 3.00. The metadata can allow the computerized system to create an infinite variety of customized set registry reports to be registered enabling the customer to accumulate the desired collection. In some aspects, some of the selected metadata can be listed on the flip of a graded card.

Once a list of qualifying players is determined by the User to be satisfactory the list may be saved as a customized set registry report. A customized set registry report can be saved on the database 130 or on a separate storage device and can be configured to be accessed by the public or saved as a private report such that it cannot be openly accessed by the public. The customized set registry report can create a set of cards that a user would like to collect which could allow a user to collect very scarce cards without their customized set registry report creating attention and possibly more competition. The customized set registry report can be configured to provide the user the option to grade a card that they have obtained that is part of their customized set registry report. The user can then notify the computerized system that such card from their set registry report will be submitted for grading, and upon the completion of the grading, such grade will be populated on their customized set registry.

The customized set registry report can identify cards that have been graded by the computerized system, and organize them by grade or any other selected criteria such as, but not limited to, player, manufacturer, year, position, etc. Additionally, cards that are part of the customized set registry report can be cards that have not been graded by the computerized system. This allows the user to know which cards of the customized set registry report have been graded by the computerized system and which have not. In some aspects, the customized set registry report can be customized to only include cards that have been graded by the computerized system. In some aspects, the customized set registry report can be customized to only include cards that have not been graded by the computerized system. In yet some aspects, the customized set registry report can be customized to include cards that have or have not been graded by the computerized system. The customization of the customized set registry report is determined by the user and can be set based on any of the criteria discussed herein.

A customized set registry report user may elect to make their customized set registry report public to gain assistance from and access to others in order to identify the possible availability and/or source of specific cards in the customized set registry report. The customized set registry report can be accessible through a network interface, such as but not limited to an internet website created by the computerized system or an external system that uploads the customized set registry report to the database 130. The website will permit collectors to communicate with each other regarding customized set registries or customized set registry reports, and the website will be at least one manner for the parties to communicate without their identities being disclosed. The set registry report user can post their cards that are part of their set registry report that have been graded by the computerized system. The user can allow only the grade to be visible to the public, or can allow the entire grade report to be visible to the public. A trading exchange may be created that comprises a searchable database of cards graded by the computerized system to allow users to purchase and/or sell a card within a public Set Registry which will be system-managed to protect the buyer (assures card purchased will be delivered) and seller (assured purchase price will be paid).

At least one advantage of the disclosure is that the customized set registry report can identify whether any cards that are part of the customized set registry report have been graded by the computerized system. This will allow a collector to know whether any cards of the customized set or customized set registry report have been graded which gives a higher degree of security and/or reliability of the number of graded cards available, since the computerized system can determine if a card has been re-submitted for a re-grade, as discussed above.

Aspects of the disclosure may comprise high resolution scanner images or high magnification lenses and/or high-resolution digital cameras to capture images with detail that is imperceptible to the naked eye even using hand held magnifiers, as is currently used in conventional grading. Precise imaging tools may, for example, be utilized to measure thickness, curves, indents, depth, breadth, size, scratches, dents, creases, color, area, length, etc. Precise location and stability of tools in an enclosed and controlled environment are utilized to assure consistency of results. Because the human element is removed, grading of a given collectible 116, when repeated, will provide within known fixed filters and proprietary algorithms, a statistically valid and similar result, over and over again. Environmental factors are removed from the process such as uncontrolled light, physical movement, distance of lens from Subject, angle, type and configuration of lights and variations in the application of image processing algorithms, as well as fatigue, emotional variance, different eyesight capabilities and different human weighting of defects from different human graders to assure consistency. However, in some aspects, an image of the collectible may be taken from a location remote and/or external to the computerized system utilizing various different types of imaging devices, such as but not limited to, smart phones, digital cameras, and the like. In such aspects, the grading of the collectible will be based on the external image submitted to the computerized system.

The computerized system 100 may utilize many image processing algorithms to examine all the criteria necessary for grading. The computerized system 100 may be implemented as a system utilizing a comprehensive examination and analysis of all grading aspects of a collectible 116 for the purpose of grading a given collectible 116 in a consistent manner. A precise and accurate grade must be able to be similarly reproduced on a given collectible 116 when such collectible 116 is tested repeatedly. A precise and accurate grading system must use grading criteria that are standardized and consistently applied to all collectibles 116 if it is to provide a basis for comparing one collectible to another when the collectibles are not similar, such as a 1952 Topps Mickey Mantle Baseball card with a 1957 Topps Mickey Mantle baseball card.

There is no grading system in use today that is not manual, i.e., based on human judgment. These grading systems lead to errors, inconsistent grades, varying points of grading emphasis by individual graders and re-grading of the same card resulting in different grades. Manual systems may also provide higher grades given to more "important" customers or larger users of the grading service thus depriving the smaller customer from playing on a level playing field. Grading companies state publicly that graders do not know the owner of a collectible 116 but this statement neither assures that a non-grader/supervisor does not know the collectible 116 owner's identity nor that the nongrader/supervisor does not have the means to influence a grade. Further, it is equally important that a card grade may be influenced as it is that the market believes that it could be influenced.

TAG Proof is a card that is identified as virtually perfect and does not have any visible, apparent, and/or significant defects. Similar in concept to a Proof coin issued by the U.S. Mint, the TAG Proof may be issued by the manufacture or by TAG in a controlled environment. TAG may go to the manufacture's printing facilities and grade cards as they are printed. TAG will wear gloves; human hands will not touch the cards. As TAG identifies cards that receive a perfect grade (Proof) subject to permitted system variance they will be placed in holders and marked as "Proof". The TAG Proof card can be the standard upon which other cards of the same type are compared against to determine the grade and/or quality.

Although the present disclosure and its advantages have been described in detail, it should be understood that various changes, substitutions and alterations can be made herein without departing from the technology of the disclosure as defined by the appended claims. For example, relational terms, such as "above" and "below" are used with respect to a light source or a collectible. Of course, if the light source or collectible is inverted, above becomes below, and vice versa. Additionally, if oriented sideways, above and below may refer to sides of the light source or collectible. Moreover, the scope of the present application is not intended to be limited to the particular configurations of the process, machine, manufacture, composition of matter, means, methods and steps described in the specification. As one of ordinary skill in the art will readily appreciate from the disclosure, processes, machines, manufacture, compositions of matter, means, methods, or steps, presently existing or later to be developed that perform substantially the same function or achieve substantially the same result as the corresponding configurations described herein may be utilized according to the present disclosure. Accordingly, the appended claims are intended to include within their scope such processes, machines, manufacture, compositions of matter, means, methods, or steps.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, and modules described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, multiple microprocessors, one or more microprocessors in conjunction with a DSP core, or any other such configuration.

The steps of a method or algorithm described in connection with the disclosure may be embodied directly in hardware, in a software module executed by a processor, or in a combination of the two. A software module may reside in RAM, flash memory, ROM, EPROM, EEPROM, registers, hard disk, a removable disk, a CD-ROM, solid state storage, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal. In yet other aspects, the processor can be remote to the storage medium and accesses the storage medium through a linked connection.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can include RAM, ROM, EEPROM, CD-ROM or other optical disk storage, magnetic disk storage or other magnetic storage devices, solid state, or any other medium that can be used to carry or store specified program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

In the present disclosure, the processor may serve as a structure for computer-implemented functions as described herein because the function(s) described in one or more aspects of the present disclosure are coextensive with the processor itself. Further, such a processor may serve as structure for functions that may be achieved by a general purpose computer without special programming, because the coextensive functions include receiving data, storing data, processing data, etc. Further, the present disclosure are removed from the abstract, and do not merely limit the use of an abstract idea to a particular technological environment. The present disclosure expands basic building blocks beyond the mere sum of the parts, at least for the reason that the present disclosure provides faster, more consistent, and more reliable results than obtainable with current methods and devices.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

We claim:

1. A computerized system for grading a collectible, comprising:
    an image acquisition device configured to capture at least one image of the collectible and generate at least one output signal comprising the at least one image of the collectible and at least one variable related to the collectible;
    a computer system comprising at least one processor comprising processor-executable computer instructions, the computer system connected to the image acquisition device and configured to provide operational instructions to the image acquisition device;
    a database comprising a datastore of information accessible by the computer system, the datastore comprising information related to at least the collectible;

wherein the at least one processor applies at least one processing routine to the at least one output signal from the image acquisition;

wherein the computer system is configured to transmit the results of the at least one processing routine to the database, wherein the database stores the results within the datastore of information, such that at least one report can be created by the computer system based on the datastore of information, wherein the at least one report comprises a grade report of the collectible.

2. The computerized system of claim 1, wherein the database further comprises information of known collectibles, metadata related to known collectibles and graded collectibles, and at least one image of collectibles graded by the computerized system.

3. The computerized system of claim 1, wherein the datastore of information comprises at least one measured attribute of the collectible, at least one set of metadata of the collectible, and the at least one image of the collectible.

4. The computerized system of claim 3, wherein the at least one set of metadata comprises external information of the collectible.

5. The computerized system of claim 4, wherein the external information comprises information of the collectible that may or may not be physically present on the collectible.

6. The computerized system of claim 4, wherein the external information comprises information of a main subject of the collectible.

7. The computerized system of claim 2, wherein the at least one report comprises a population report of the collectibles graded by the computerized system.

8. The computerized system of claim 7, wherein the population report can be customized based on any selected information contained within the database.

9. The computerized system of claim 8, wherein the population report indicates the total number of graded collectibles based on the selected information within the database.

10. The computerized system of claim 2, wherein the at least one report comprises a customized set or customized set registry report of known collectibles, wherein the customized set or customized set registry report is customized based on selected metrics of the known collectibles.

11. The computerized system of claim 10, wherein the customized set or customized set registry report identifies known collectibles that have been graded by the computerized system.

12. The computerized system of claim 1, wherein the grade report of the collectible comprises a grade of proof, wherein the grade of proof is for a collectible that is determined to be substantially perfect by definition and not comprise any readily apparent identifiable defect.

13. The computerized system of claim 12, wherein the grade of proof is made prior to the collectible being touched by a person in an unprotected manner.

14. The computerized system of claim 12, wherein the grade report of the collectible further comprises a grade of near-proof, wherein the grade of near-proof is a collectible that is in a condition similar to a proof graded collectible but does not assure that the collectible was not contacted by a person in an unprotected manner.

15. The computerized system of claim 1, wherein the grade report of the collectible is stored on the database and is arranged to be accessible by remote users, wherein remote users can view grade reports of any collectible graded by the computerized system.

16. The computerized system of claim 15, wherein the database creates a searchable database of grade reports of all collectibles graded by the computerized system, such that the searchable database only comprises grade reports of collectibles graded by the computerized system.

17. The computerized system of claim 15, wherein remote users can search through the various grade reports stored on the database and place an order to purchase the collectible graded by the computerized system.

18. A computerized system for grading a collectible, comprising:

a database comprising a datastore of information accessible by a workstation, wherein the datastore comprises information related to a plurality of known collectibles;

said workstation configured to create a customized set or customized set registry report of said plurality of known collectibles, wherein said customized set or customized set registry report comprises a list of said plurality of known collectibles based on a number of selected metrics of said plurality of known collectibles, wherein said list identifies specific collectibles from said plurality of known collectibles that meet the criteria of the selected metrics;

wherein said computerized system is configured to allow a user having one of the specific collectibles identified by said list to be submitted for grading, said computerized system comprising:

an image acquisition device configured to capture at least one image of the specific collectible and generate at least one output signal comprising the at least one image of the specific collectible;

a computer system comprising at least one processor comprising processor-executable computer instructions, the computer system connected to the image acquisition device and configured to provide operational instructions to the image acquisition device, wherein the at least one processor applies at least one processing routine to the at least one output signal from the image acquisition device;

wherein the computer system is configured to transmit the results of the at least one processing routine to the database, such that at least one report can be created by the computer system based on the datastore of information, wherein the at least one report comprises a grade report or partial score of the specific collectible.

19. A method of grading a collectible, comprising:

capturing at least one image of a collectible;

transmitting said at least one image to at least one processor;

applying at least one image processing routine onto said at least one image;

comparing the results of said at least one image processing routine with results of previously graded collectibles stored on a database to determine whether the results of said at least one image processing routine at least partially match the results of said previously graded collectibles; and producing a grade report or partial score of said collectible based on results of said at least one image processing routine.

20. The method of grading a collectible of claim 19, further comprising:

examining said collectible to identify at least one defect within said at least one image of said collectible;

quantifying said at least one defect of said collectible;

assigning a numerical value to said at least one defect according to a predetermined grading criteria; and calculating a grading score for said collectible based on said numerical value assigned to said at least one defect or measurable characteristic in said predetermined grading criteria.

21. The method of grading a collectible of claim 19, wherein an existing grade report or partial score of said previously graded collectible is updated with the results of the grade report or partial score of said collectible in the event of a match between the results of said at least one image processing routine with the results of previously graded collectibles stored on said database.

22. The method of grading a collectible of claim 20, wherein the comparison between previously graded collectibles and said collectible comprises a comparison between said at least one defect or measurable characteristic in said collectible and at least one previously graded defect or measurable characteristic in said previously graded collectibles.

23. The method of grading a collectible of claim 20, wherein the comparison between previously graded collectibles and said collectible comprises a comparison between physical characteristics of said collectible and said previously graded collectibles.

\* \* \* \* \*